United States Patent
Lee et al.

(10) Patent No.: US 10,863,087 B2
(45) Date of Patent: Dec. 8, 2020

(54) MOBILE TERMINAL SELECTING NORMAL MODE OR WIDE ANGLE CAMERA MODE BASED ON MOVEMENT OF MOBILE TERMINAL

(71) Applicant: LG ELECTRONICS INC., Seoul (KR)

(72) Inventors: Jinseong Lee, Seoul (KR); Kyuhee Kim, Seoul (KR); Chorok Shin, Seoul (KR); Seongeun Kim, Seoul (KR); Younghoon Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/326,587

(22) PCT Filed: Dec. 1, 2016

(86) PCT No.: PCT/KR2016/014074
§ 371 (c)(1),
(2) Date: Feb. 19, 2019

(87) PCT Pub. No.: WO2018/034390
PCT Pub. Date: Feb. 22, 2018

(65) Prior Publication Data
US 2019/0191087 A1 Jun. 20, 2019

(30) Foreign Application Priority Data
Aug. 19, 2016 (KR) .......................... 10-2016-0105411

(51) Int. Cl.
H04N 5/232 (2006.01)
H04N 5/225 (2006.01)
(Continued)

(52) U.S. Cl.
CPC .......... *H04N 5/23245* (2013.01); *G06T 7/55* (2017.01); *H04M 1/7258* (2013.01);
(Continued)

(58) Field of Classification Search
CPC ............................................... H04N 5/232935
See application file for complete search history.

(56) References Cited

U.S. PATENT DOCUMENTS 6,115,197 A * 9/2000 Funahashi .............. G02B 7/102
359/701
8,701,049 B2 * 4/2014 Kim .................... G06F 3/04886
715/863

(Continued)

FOREIGN PATENT DOCUMENTS

JP 2001-111976 A 4/2001
KR 10-2007-0010689 A 1/2007
(Continued)

OTHER PUBLICATIONS

Wakamori Masahiro, WO-2005098531-A1, Eye Image Capturing Device and Portable Terminal; Oct. 2005, pp. 1-4; English Translation (Year: 2005).*

*Primary Examiner* — Cynthia Segura
(74) *Attorney, Agent, or Firm* — Birch, Stewart, Kolasch & Birch, LLP

(57) ABSTRACT

A mobile terminal is disclosed. The mobile terminal according to an embodiment of the present invention comprises: a camera unit including a wide-angle lens; an input interface for receiving an input from a user; and a controller for controlling the camera unit such that the camera unit captures an image in a normal mode in which the image is captured at a normal angle or a wide-angle mode in which the image is captured at a wide angle, on the basis of an input for moving the mobile terminal.

11 Claims, 22 Drawing Sheets

(51) Int. Cl.
*G06T 7/55* (2017.01)
*H04M 1/725* (2006.01)

(52) U.S. Cl.
CPC ............ *H04N 5/225* (2013.01); *H04N 5/232* (2013.01); *H04N 5/232935* (2018.08)

(56) References Cited

U.S. PATENT DOCUMENTS

| | | | | |
|---|---|---|---|---|
| 9,648,236 | B2* | 5/2017 | Choi | G03B 13/36 |
| 9,848,125 | B2* | 12/2017 | Choi | G03B 13/36 |
| 10,154,186 | B2* | 12/2018 | Kang | H04N 5/2259 |
| 2006/0044399 | A1* | 3/2006 | Fredlund | G06F 3/0304 |
| | | | | 348/207.99 |
| 2013/0265514 | A1* | 10/2013 | Li | G02F 1/1343 |
| | | | | 349/41 |
| 2014/0098195 | A1* | 4/2014 | Pace | H04N 13/25 |
| | | | | 348/47 |
| 2015/0189178 | A1* | 7/2015 | Lombardi | G06F 3/00 |
| | | | | 348/207.99 |
| 2016/0219217 | A1* | 7/2016 | Williams | H04N 5/23293 |
| 2017/0013179 | A1* | 1/2017 | Kang | H04N 5/2259 |
| 2017/0134643 | A1* | 5/2017 | Kim | G06K 9/00281 |
| 2017/0223261 | A1* | 8/2017 | Shimizu | G06K 9/6202 |
| 2018/0082140 | A1* | 3/2018 | Ida | G06K 9/2081 |
| 2019/0132569 | A1* | 5/2019 | Karpenko | G06T 7/246 |
| 2019/0206013 | A1* | 7/2019 | Okuyama | G06T 1/0007 |
| 2020/0099894 | A1* | 3/2020 | Yun | H04N 5/232935 |

FOREIGN PATENT DOCUMENTS

| | | |
|---|---|---|
| KR | 10-2009-0113801 A | 11/2009 |
| KR | 10-1633342 B1 | 6/2016 |
| KR | 10-2016-0094758 A | 8/2016 |
| WO | WO-2005098531 A1 * | 10/2005 ............ A61B 5/117 |

* cited by examiner

MOBILE TERMINAL SELECTING NORMAL MODE OR WIDE ANGLE CAMERA MODE BASED ON MOVEMENT OF MOBILE TERMINAL

CROSS REFERENCE TO RELATED APPLICATIONS

This application is the National Phase of PCT International Application No. PCT/KR2016/014074, filed on Dec. 1, 2016, which claims priority under 35 U.S.C. 119(a) to patent application Ser. No. 10-2016-0105411, filed in the Republic of Korea on Aug. 19, 2016, all of which are hereby expressly incorporated by reference into the present application.

TECHNICAL FIELD

The present invention relates to a mobile terminal capable of capturing an image by changing a mode of the mobile terminal to any one of a wide angle mode and a normal mode based on a movement input of the mobile terminal.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Meanwhile, recently, the functions of a mobile terminal have been diversified, and the representative example thereof may be a mobile terminal equipped with a camera.

Meanwhile, recently, there has been introduced a technology of widening a viewing angle by using a wide angle lens. The wide angle helps capturing an image of a wider region. Meanwhile, since the captured region is expanded, a region does not required by a user may be included in the captured image sine the captured image is widened.

When the user takes a selfie using a camera mounted on the front surface of the mobile terminal, the viewing angle is widened, so even a person next to the user may be captured.

The image captured in such a manner may be partially deleted through an editing function thereafter. In this case, the additional manipulation of the user may be necessary.

DISCLOSURE

Technical Problem

In order to solve the above problem, an object of the present invention relates to a mobile terminal capable of capturing an image by changing the mode of the mobile terminal to any one of the wide angle mode and the normal mode, based on the movement input of the mobile terminal.

Technical Solution

In order to accomplish the objects, according to one aspect of the present invention, there is provided a mobile terminal including a camera including a wide angle lens, an input interface to receive an input from a user, and a controller configured to control the camera to capture an image in one of a normal mode for capturing an image at a normal angle and a wide angle mode for capturing an image at a wide angle, based on an input for moving the mobile terminal.

Advantageous Effects

According to the present invention, the viewing angle is changed and provided by reflecting the intent of the user even if there is an additional input for changing the viewing angle.

BEST MODE

Mode for Invention

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
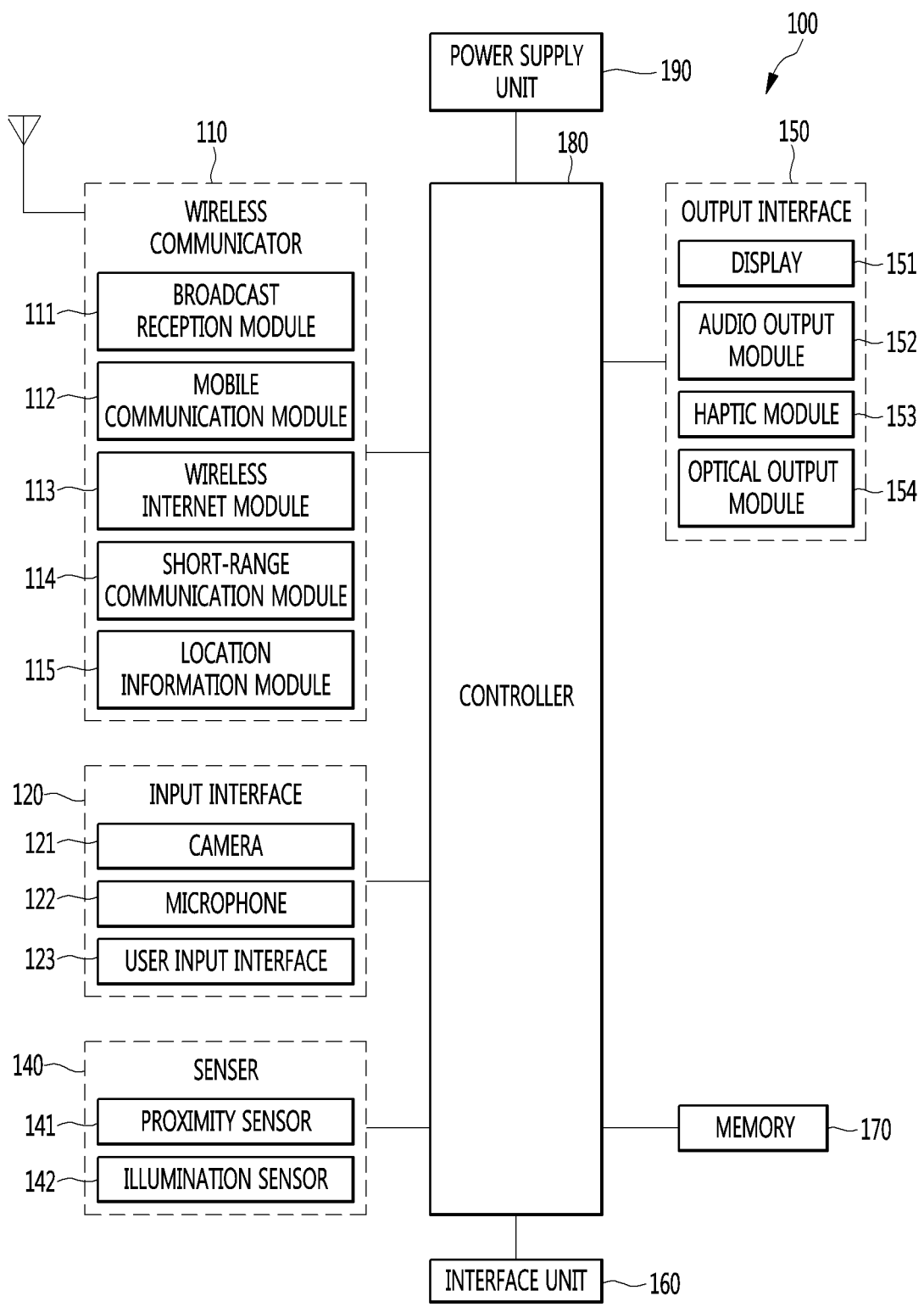
FIG. 1A is a block diagram illustrating a mobile terminal related to the present invention.
Figure 1B:
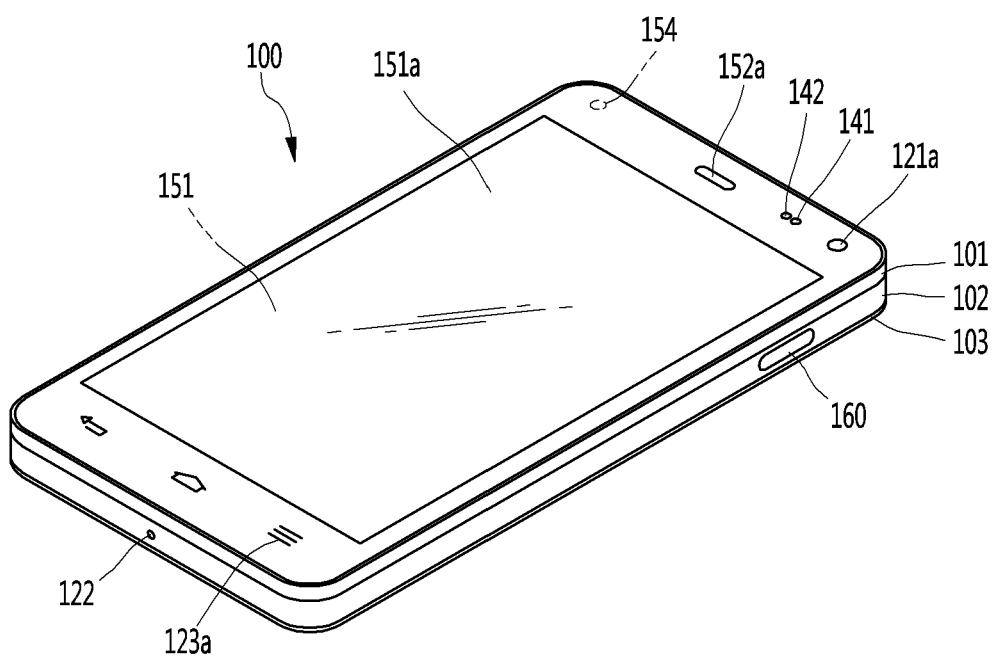
FIGS. 1B and 1C are schematic views illustrating examples of the mobile terminals when viewed in different directions.
Figure 1C:
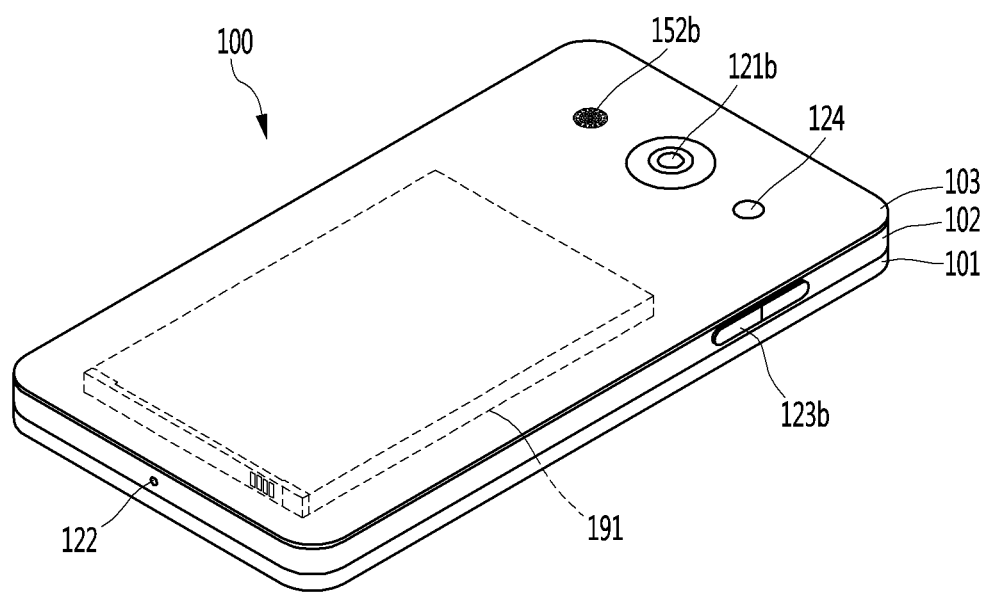

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communicator 110, an input interface 120, a sensor 140, an output interface 150, an interface unit 160, a memory 170, a controller 180, and a power supply unit 190.

It is understood that implementing all of the illustrated components is not a requirement, and that greater or fewer components may alternatively be implemented.

Referring now to FIG. 1A, the mobile terminal 100 is shown having wireless communicator 110 configured with several commonly implemented components. For instance, the wireless communicator 110 typically includes one or more components which permit wireless communication between the mobile terminal 100 and a wireless communication system or network within which the mobile terminal is located.

The wireless communicator 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communicator 110 typically includes one or more modules which connect the mobile terminal 100 to one or more networks. To facilitate such communications, the wireless communicator 110 includes one or more of a broadcast receiving module 111, a mobile communication module 112, a wireless Internet module 113, a short-range communication module 114, and a location information module 115.

The input interface 120 includes a camera 121 for obtaining images or video, a microphone 122, which is one type of audio input device for inputting an audio signal, and a user input interface 123 (for example, a touch key, a push key, a mechanical key, a soft key, and the like) for allowing a user to input information. Data (for example, audio, video, image, and the like) is obtained by the input interface 120 and may be analyzed and processed by controller 180 according to device parameters, user commands, and combinations thereof.

The sensor 140 is typically implemented using one or more sensors configured to sense internal information of the mobile terminal, the surrounding environment of the mobile terminal, user information, and the like. For example, in FIG. 1A, the sensor 140 is shown having a proximity sensor 141 and an illumination sensor 142.

If desired, the sensor 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensor 140, and in particular, information obtained from one or more sensors of the sensor 140, and combinations thereof.

The output interface 150 is typically configured to output various types of information, such as audio, video, tactile output, and the like. The output interface 150 is shown having a display 151, an audio output module 152, a haptic module 153, and an optical output module 154. The display 151 may have an inter-layered structure or an integrated structure with a touch sensor in order to facilitate a touch screen. The touch screen may provide an output interface between the mobile terminal 100 and a user, as well as function as the user input interface 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail.

Regarding the wireless communicator 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the callusing the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communicator 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input interface 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input interface 123 is a component that permits input by a user. Such user input may enable the controller 180 to control operation of the mobile terminal 100. The user input interface 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensor 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensor 140. The sensor 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

In some embodiments, the display 151 may be implemented as a stereoscopic display for displaying stereoscopic images. A typical stereoscopic display may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communicator 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like).

However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display 151 is shown located on the front side of the terminal body to output information. As illustrated, a window 151a of the display 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 10. The display 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display 151 outputs information processed in the mobile terminal 100. The display 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display 151 may be implemented using two display devices, which can implement the same or different display technology. For instance, a plurality of the displays 151 may be arranged on one side, either spaced apart from each other, or these devices may be integrated, or these devices may be arranged on different surfaces.

The display 151 may also include a touch sensor which senses a touch input received at the display. When a touch is input to the display 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display 151 may also form a touch screen together with the touch sensor. Here, the touch screen may serve as the user input interface 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output interface 154 to stop the light output.

The first camera 121a can process image frames such as still or moving images obtained by the image sensor in a capture mode or a video call mode. The processed image frames can then be displayed on the display 151 or stored in the memory 170.

The first and second manipulation units 123a and 123b are examples of the user input interface 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display 151, or the like.

As another example of the user input interface 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display 151, and the like. The rear input unit may be configured to permit touch input, a push input, or combinations thereof.

The rear input unit may be located to overlap the display 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display 151 or implemented in the user input interface 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display 151 to extend the function of the mobile terminal 100. Another example of the accessory is a touch pen for assisting or extending a touch input to a touch screen.

In this specification, the term of "memory 170" may be used interchangeably with the term of "storage section 170".

In this specification, the term of "camera 170" may be used interchangeably with the term of "camera unit 170".

The input interface 120 of the mobile terminal 100 may include a sensor 140 and may perform all functions performed by the sensor 140. For example, the input interface 120 may sense the user's touch input or sense the movement of the mobile terminal 100.

Meanwhile, although the following description will be made in that the present invention is realized in the mobile terminal 100, the present invention is not limited thereto. For example, the present invention may be realized in all types of display devices. In addition, the display device may include some components or all components of the mobile terminal to be described with reference to FIG. 1A to FIG. 1C.

Figure 2:
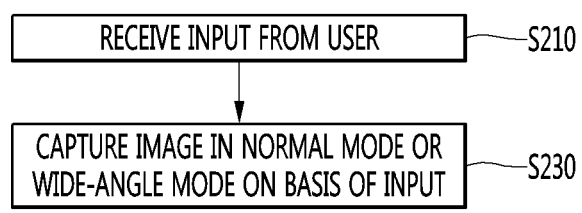
FIG. 2 is a flowchart illustrating an operating method of a mobile terminal according to an embodiment of the present invention.

FIG. 2 is a flowchart illustrating an operating method of a mobile terminal according to an embodiment of the present invention.

According to an embodiment of the present invention, the operating method of the mobile terminal may include: receiving an input from a user (S210); and controlling the camera to take a photo in any one of the normal mode that the photo is typically taken and a wide angle mode that the photo is taken at a wide angle (S230).

The camera 121 may include a wide angle lens. Herein, the wide angle lens may be a lens having a shorter focal length than that of a standard lens. For example, the focal length of the standard lens may be 40-60 mm, and the focal length of the wide angle lens may be 35 mm or less.

Hereinafter, although a wide angle lens is provided for the illustrative purpose, the present invention is not limited thereto. For example, the present invention may be applied to a wide angle lens, a fisheye lens, a 360 degree omni-directional shooting lens, or the like.

According to an embodiment of the present invention, the mobile terminal may capture an image in a wide angle mode or the normal mode.

The wide angle mode and the normal mode will be described in detail with reference to FIGS. 3 to 6.

FIGS. 3 to 6 are views illustrating the wide angle mode and the normal mode according to an embodiment of the present invention.

The mobile terminal 100 may operate in the wide angle mode or the normal mode.

In this case, the normal mode may be a mode that an image is captured at a no mal angle. In this case, the normal angle, which is a viewing angle when an image is captured, may be a viewing angle when the image is captured through a standard lens.

Figure 3:
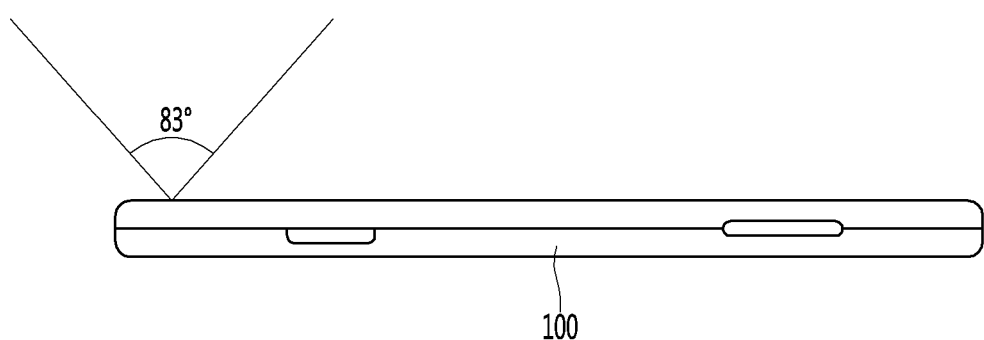
FIGS. 3 to 6 are views illustrating the wide angle mode and the normal mode according to an embodiment of the present invention.

In addition, the normal angle, which is the viewing angle when the image is captured, may be a viewing angle equal to or less than the first angle. For example, when the first angle is 85°, an image, which is captured at the viewing angle of 83°, may be an image captured at the normal angle, as illustrated in FIG. 3.

In addition, the normal angle, which is the viewing angle when the image is captured, may be a viewing angle of the first angle. For example, when the first angle is 83°, an image, which is captured at the viewing angle of 83°, may be an image captured at the normal angle, as illustrated in FIG. 3.

Meanwhile, the wide angle mode may be a mode that an image is captured at a wide angle. In this case, the wide angle, which is a viewing angle when an image is captured, may be a viewing angle when the image is captured through a wide angle lens.

Figure 5:
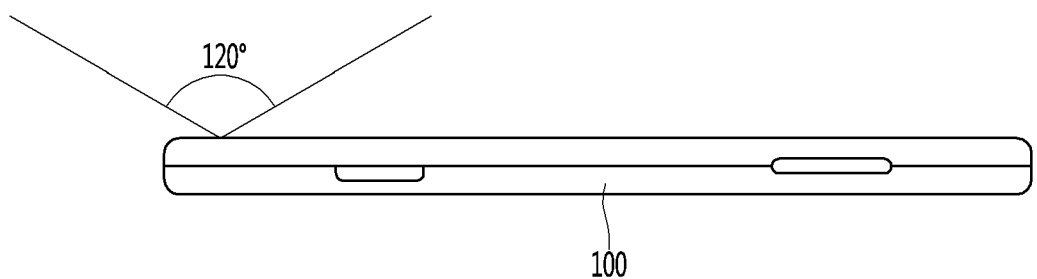

In addition, the wide angle, which is the viewing angle when the image is captured, may be a viewing angle of the second angle or more. For example, when the second angle is 115°, an image, which is captured at the viewing angle of 120° as illustrated in FIG. 5, may be an image captured at the wide angle.

In addition, the wide angle may be a viewing angle when an image is captured and may be a viewing angle of the second angle. For example, when the second angle is 120°, an image, which is captured at the viewing angle of 120° as illustrated in FIG. 5, may be an image captured at a wide angle.

Figure 4:
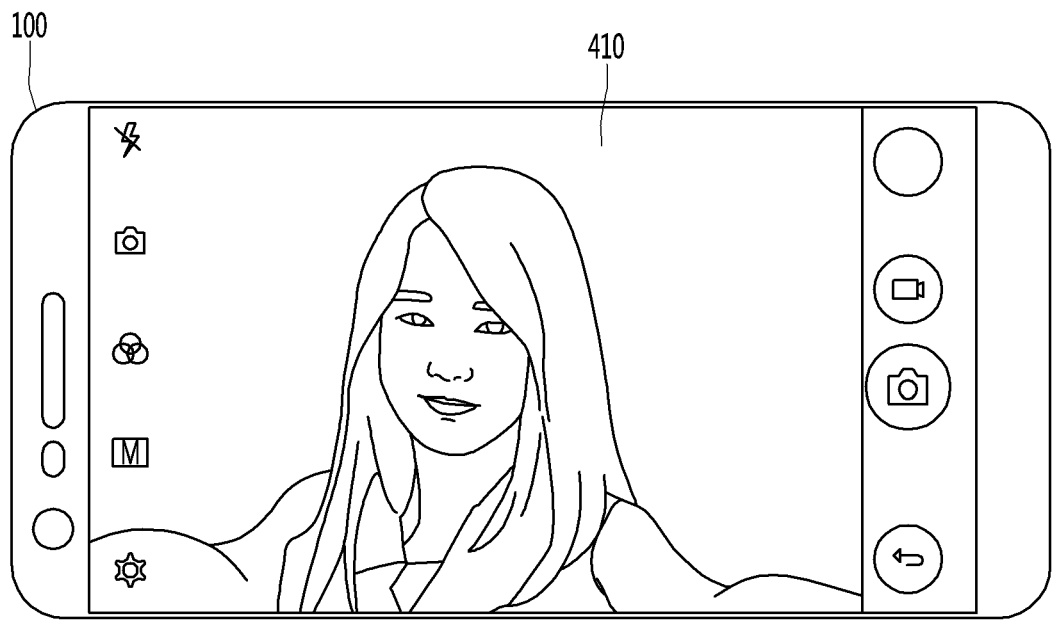
Figure 6:
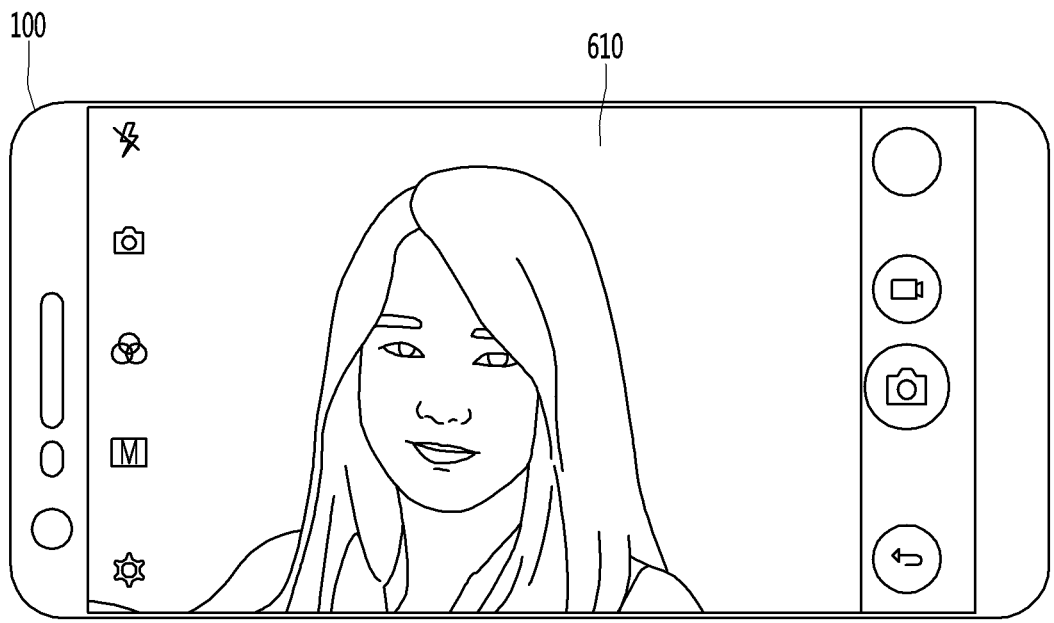

FIG. 4 is a view illustrating an image 410 captured at the wide angle, and FIG. 6 is a view illustrating an image 610 captured at the normal angle.

The second angle may be greater than the first angle. In other words, a wide angle may be wider than the normal angle. Accordingly, the image 410, which is captured at the wide angle in the wide angle mode, may be an image captured at a viewing angle wider than a viewing angle of the image 610 captured at the normal angle in the normal mode.

Accordingly, the image 410, which is captured at the wide angle in the wide angle mode as illustrated in FIG. 4, may include an image having a wider range than the range of the image 610 captured at the normal angle in the normal mode.

Meanwhile, the controller 180 may display a preview image. In this case, the preview image is an image received through the camera 121 and displayed on the display 151 after the image is captured.

In detail, when the mode of the mobile terminal 100 is the normal mode, the controller 180 may control the display 151 to display an image corresponding to the normal angle. In this case, the image corresponding to the normal angle may refer to an image, which has a viewing angle in a normal angle range, in an image received through the camera 121.

Meanwhile, when an input for capturing an image is received in the state that the image corresponding to the normal angle is displayed, the controller 180 may capture an image corresponding to the normal angle.

In detail, when the mode of the mobile terminal 100 is the wide angle mode, the controller 180 may control the display 151 to display an image corresponding to the wide angle. In this case, the image corresponding to the wide angle may refer to an image, which a viewing angle in a wide angle range, in an image received through the camera unit 121.

Meanwhile, when an input for capturing an image is received in the state that the image corresponding to the wide angle is displayed, the controller 180 may capture an image corresponding to the wide angle.

Figure 7:
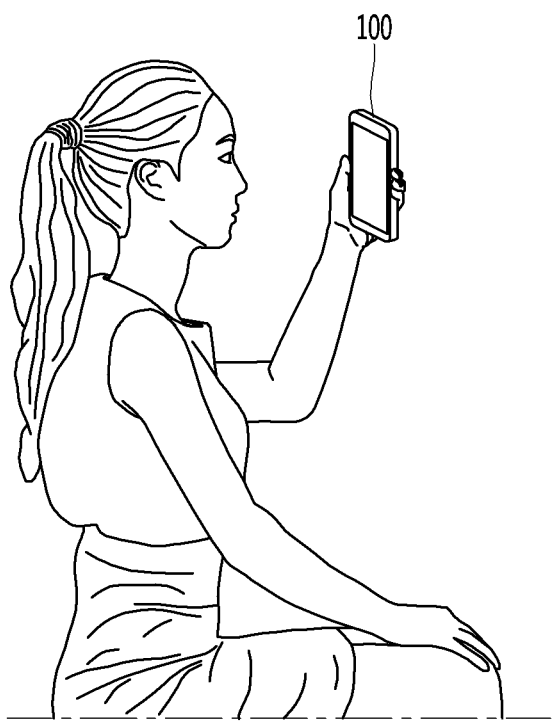
FIGS. 7 and 8 are view illustrating a method for receiving a movement input of the mobile terminal, according to an embodiment of the present invention.
Figure 8:
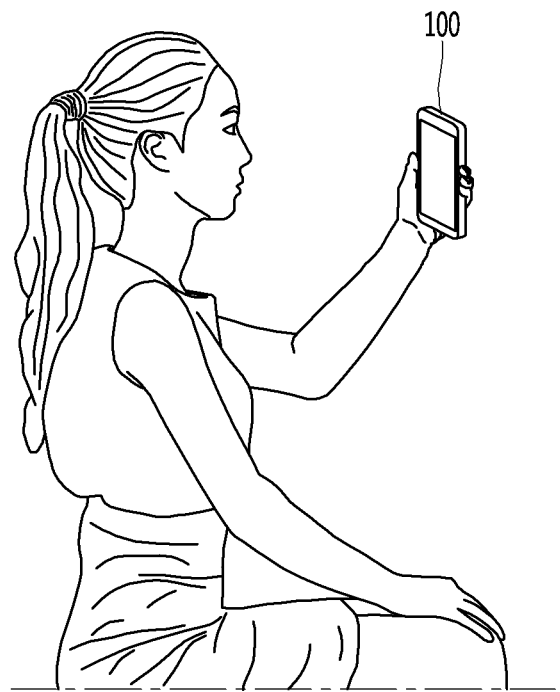

FIGS. 7 and 8 are view illustrating a method for receiving an input for moving the mobile terminal, according to an embodiment of the present invention.

The controller 180 may receive the input for moving the mobile terminal 100. In detail, the controller 180 may receive information on the movement of the mobile terminal 100 through the input interface 120.

In addition, the controller 180 may acquire information on at least one of the increase or the decrease in the distance between the mobile terminal 100 and the user of the mobile terminal 100, based on the information on the movement of the mobile terminal 100.

In detail, in a capturing mode through a camera mounted on the front surface of the mobile terminal 100, when the mobile terminal 100 moves in the direction of the front surface of the mobile terminal 100 as illustrated in FIG. 7, the controller 180 may determine that the distance between the mobile terminal 100 and the user is decreased. In addition, the controller 180 may acquire the information on the decreased distance between the mobile terminal 100 and the user In detail, in a capturing mode through a camera mounted on the front surface of the mobile terminal 100, when the mobile terminal 100 moves in the direction of the rear surface of the mobile terminal 100 as illustrated in FIG. 8, the controller 180 may determine that the distance between the mobile terminal 100 and the user is increased. In addition, the controller 180 may acquire the information on the increased distance between the mobile terminal 100 and the user.

According to another embodiment, the controller 180 may acquire information on at least one of the increase or the decrease in the distance between the mobile terminal 100 and the user, based on an image received through the camera 121. In detail, the controller 180 may acquire information on at least one of the increase or the decrease in the distance between the mobile terminal 100 and the user, based on the size of an object included in the image received through the camera 121.

For example, in the capturing mode through the camera mounted on the front surface of the mobile terminal 100, when the mobile terminal 100 moves in the direction of the front surface of the mobile terminal 100 as illustrated in FIG. 7, the face of the user, which is included in the image, is increased. In this case, the controller 180 may determine that the distance between the mobile terminal 100 and the user is decreased, and may acquire the information on the decreased distance between the mobile terminal 100 and the user.

For example, in the capturing mode through the camera mounted on the front surface of the mobile terminal 100, when the mobile terminal 100 moves in the direction of the rear surface of the mobile terminal 100 as illustrated in FIG. 8, the face of the user, which is included in the image, is decreased. In this case, the controller 180 may determine that the distance between the mobile terminal 100 and the user is increased, and may acquire the information on the increased distance between the mobile terminal 100 and the user.

FIGS. 9A to 11C are views illustrating an image captured as the distance between the mobile terminal 100 and the user is increased or decreased, according to an embodiment of the present invention.

Figure 9A:
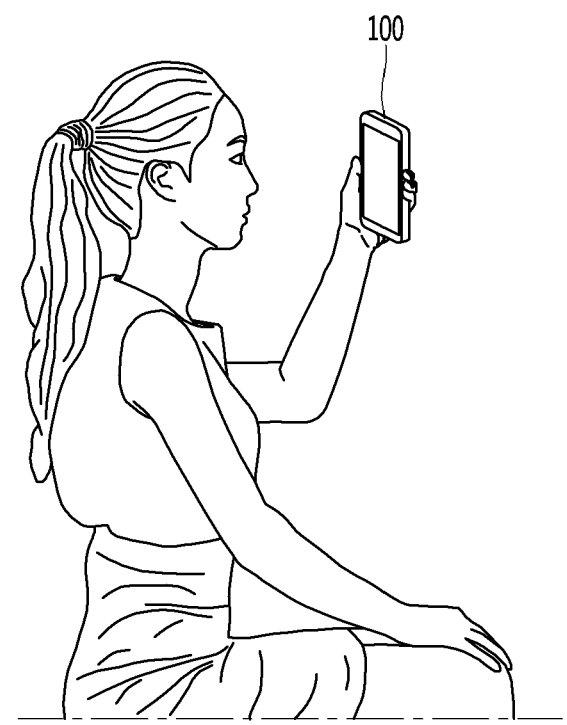
FIGS. 9A to 11B are views illustrating an image captured as the distance between the mobile terminal and the user is increased or decreased, according to an embodiment of the present invention.
Figure 9B:
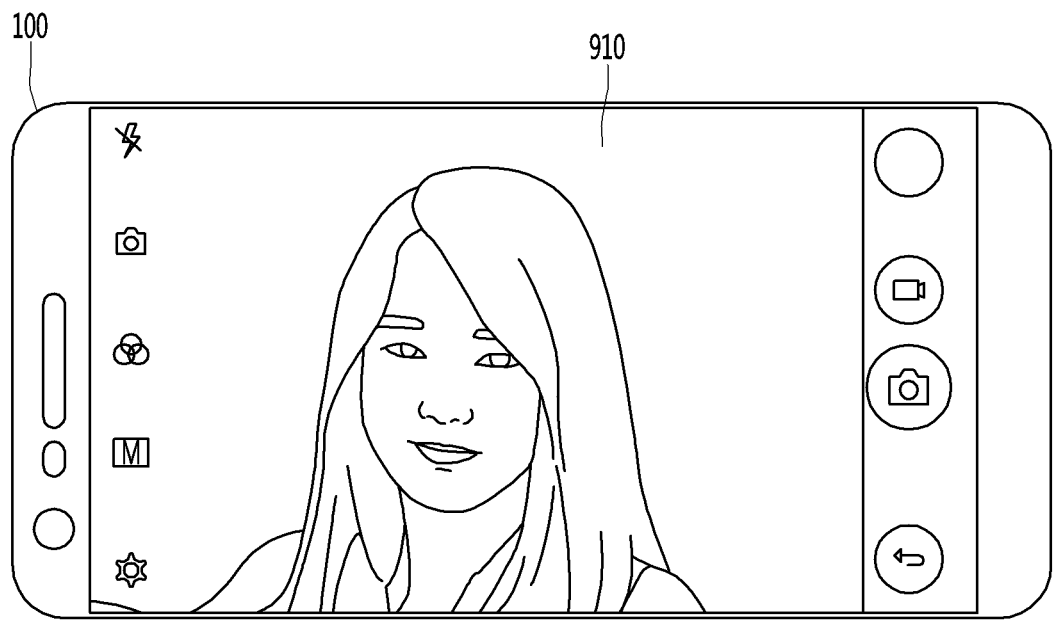

FIG. 9A is a view illustrating a user attempting to capture himself/herself by using the camera 121 mounted on the front surface of the mobile terminal 100, and FIG. 9B is a view illustrating an image captured in a current state.

The following description will be made on the assumption that the capture mode of the mobile terminal 100 is the normal mode.

In the state that the capture mode of the mobile terminal 100 is the normal mode, the controller 180 may capture an image in the normal mode. In detail, the controller 180 may capture an image, which is received through the camera 121, at the normal angle. For example, in the state that the capture mode of the mobile terminal 100 is the normal mode, the controller 180 may capture an image at the viewing angle of 83°.

FIG. 9B illustrates an image 910 captured at the normal angle in the state that the mode of the mobile terminal 100 is the normal mode.

Figure 11A:
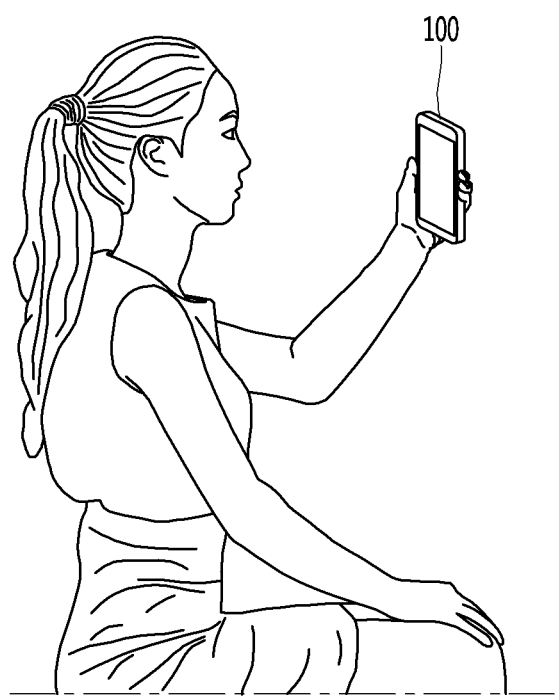
Figure 11B:
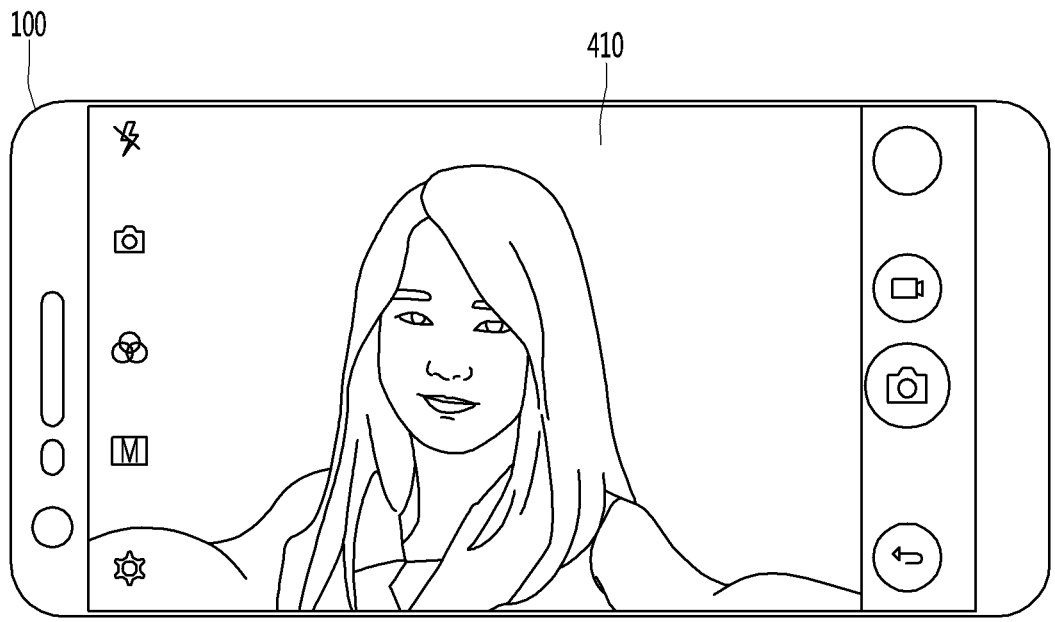

Meanwhile, FIG. 11A is a view illustrating that the distance from the mobile terminal 100 to the user, which is illustrated in FIG. 9A, is increased by the first distance, and FIG. 11B is a view illustrating an image captured in the state that the distance from the mobile terminal 100 to the user is increased by the first distance.

When the distance between the mobile terminal 100 and the user is increased to the first distance or more in the state that the mobile terminal 100 is the normal mode, the controller 180 may capture an image in a wide angle mode. For example, when the distance between the mobile terminal 100 and the user is increased to 20 cm or more in the state that the mobile terminal 100 operates in the normal mode, the controller 180 may capture an image at the viewing angle of 120°.

FIG. 11B illustrates an image 410 captured at the wide angle in the state that the mode of the mobile terminal 100 is the wide angle mode.

The image 410 captured at the wide angle may include an image having a wider range than the range of the image 910 at the normal angle as the distance between the mobile terminal 100 and the user is increased to the first distance or more. In addition, the image 410 captured at the wide angle may include an image having a viewing angle wider than a viewing angle of the image 910 at the normal angle, because the viewing angle is widened as the distance between the mobile terminal 100 and the user is increased to the first distance or more.

To the contrary, as illustrated in FIGS. 11A and 11B, when the distance between the mobile terminal 100 and the user is decreased to the second distance or more in the state that the mobile terminal 100 is the wide angle mode, the controller 180 may capture an image in the normal mode.

The first distance may be equal to the second distance. However, the present invention is not limited thereto, and the first distance may be different from the second distance depending on settings.

Meanwhile, when the distance between the mobile terminal 100 and the user is increased in the state that the mobile terminal 100 is the normal mode, the controller 180 may increase the viewing angle of an image captured.

In detail, as illustrated in FIGS. 9A and 9B, when the distance between the mobile terminal 100 and the user is increased in the state that the mobile terminal 100 is the normal mode, the controller 180 may capture the image by increasing the viewing angle. For example, when the distance between the mobile terminal 100 and the user is increased to 10 cm or more in the state that the mobile terminal 100 operates in the normal mode, the controller 180 may capture an image at the viewing angle of 101.5°.

Figure 10A:
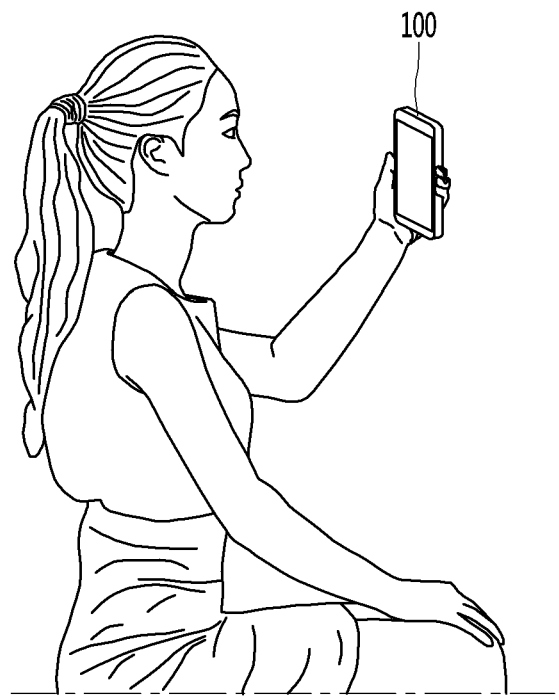
Figure 10B:
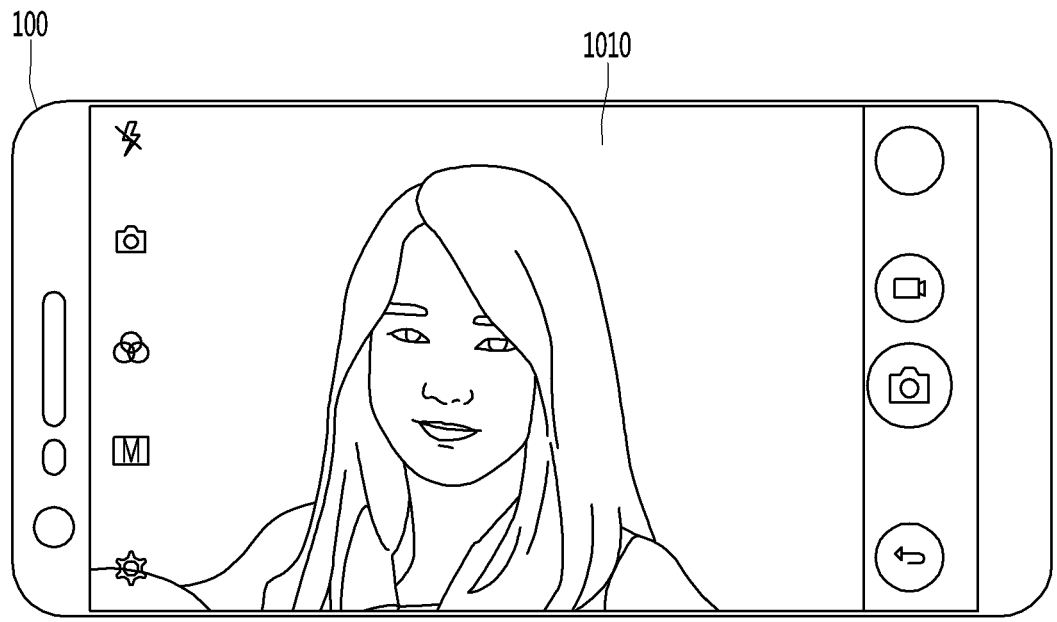

The state that the distance between the mobile terminal 100 and the user is increased is illustrated in FIG. 10A. An image 1010 captured with the increased viewing angle is illustrated in FIG. 10B.

When the distance between the mobile terminal 100 and the user is increased to the first distance or more in total as the distance between the mobile terminal 100 and the user is additionally increased in the state that the viewing angle of the captured image is increased, the controller 180 may capture an image in a wide angle mode. For example, in the state that the image is captured at the viewing angle of 101.5° as the distance between the mobile terminal 100 and the user is increased to 10 cm, the distance between the mobile terminal 100 and the user additionally is increased by 10 cm to increase 20 cm in total.

To the contrary, when the distance between the mobile terminal 100 and the user is increased in the state that the mobile terminal 100 is in the wide angle mode, the controller 180 may decrease the viewing angle to capture an image. When the distance between the mobile terminal 100 and the user is decreased to the second distance or more in total as the distance between the mobile terminal 100 and the user is additionally decreased in the state that the viewing angle of the captured image decrease, the controller 180 may capture an image in the normal mode.

Meanwhile, the increment in the viewing angle may vary depending on the increased distance between the mobile terminal 100 and the user. For example, the viewing angle may be increased by 1 degree per 1 cm until the distance between the mobile terminal 100 and the user is increased to 5 cm. The viewing angle may be increased by 2.7° per 1 cm until the distance between the mobile terminal 100 and the user is increased to 5 cm-15 cm. The viewing angle may be increased by 1° per 1 cm until the distance between the mobile terminal 100 and the user is increased to 5 cm-20 cm. Due to such a configuration, the user may rapidly switch between the normal mode and the wide angle mode. When the viewing angle approximates to that in the wide angle mode or the normal mode, the viewing angle may be finely adjusted to a desired viewing angle for capturing an image.

Meanwhile, when the distance between the mobile terminal 100 and the user is increased to the first distance or more, the viewing angle is not increased anymore. For example, when the first distance is 20 cm, the viewing angle is increased until the distance between the mobile terminal 100 and the user becomes 20 cm such that the viewing angle becomes 120°. However, even if the distance between the mobile terminal 100 and the user is increased by 20 cm or more, the viewing angle may be 120° without change.

Meanwhile, when the distance between the mobile terminal 100 and the user is decreased to the second distance or more, the viewing angle may not decrease any more. For example, when the first distance is 20 cm, the viewing angle is decreased until the distance between the mobile terminal 100 and the user becomes 20 cm such that the viewing angle becomes 83°. However, even if the distance between the mobile terminal 100 and the user is more decreased form 20 cm, the viewing angle may be 83° without change.

As described above, according to the present invention, the viewing angle may be changed by reflecting the intent of the user without an additional input for changing the viewing angle.

For example, according to an embodiment of the present invention, the camera 121 including the wide angle lanes may be mounted on the front surface of the mobile terminal 100. Meanwhile, when a user taking a selfie wants to capture an image of the user together with the user's friend, the user may move the mobile terminal 100 away from the user. In this case, according to the present invention, the mobile terminal 100 may provide an environment that the image is contained in a wider region by changing the mode such that the image is captured at a wide angle.

For another example, when the user taking a selfie wants to individually capture an image of on himself or herself, the user may move the mobile terminal 100 to be closer to the user. In this case, according to the present invention, the mobile terminal 100 may provide an environment that only the user is contained in the image by changing the mode such that the image is captured at a normal angle.

Meanwhile, the controller 180 may correct the distortion of the image captured at the normal angle in the normal mode. In detail, an image captured at a wide angle using the wide angle camera may be distorted. In this case, the controller 180 may correct the distortion of an image captured in the normal mode and may store the correction result in the storage unit 170. As described above, according to the present invention, while the image is captured by using the wide angle camera, an image captured at the normal angle is obtained, and the distortion of the image is corrected, thereby providing an image close to the image captured through the standard camera.

Meanwhile, although the previous embodiment has been described in that the capture mode is changed by determining the increase or the decrease in the distance between the user and the mobile terminal 100, the present invention is not limited thereto.

In detail, the controller 180 may capture an image in the normal mode or the wide angle mode, based on the distance between the user and the mobile terminal 100.

In more detail, the controller 180 may obtain the information on the distance between a subject and the mobile terminal 100, based on the size of an object included in the image received through the camera 121. For example, the controller 180 may obtain the information on the distance between the user and the mobile terminal 100, based on the size of a user face included in the image received through the camera 121.

In addition, when the distance between the user and the mobile terminal 100 is within the first distance, the controller 180 may capture an image at the normal angle in the normal mode. In addition, when the distance between the mobile terminal 100 and the user is increased to the second distance or more, the controller 180 may capture an image at a wide angle in a wide angle mode. In addition, when the distance between the user and the mobile terminal 100 is increased, the controller 180 may increase the viewing angle of the captured image.

Meanwhile, according to the present invention, although the description is made in that the capture mode is changed based on the input for moving the mobile terminal, the present invention is not limited thereto. For example, when the preview image is displayed in the normal mode, as the input of pinching out the preview image is received, the controller 180 may change the capture mode to the wide angle mode. For another example, when the preview image is displayed in the wide angle mode, as the input of pinching in the preview image is received, the controller 180 may change the capture mode to the normal mode.

Meanwhile, the controller 180 may capture a first image at a first ratio in the wide angle mode, and may capture a second image at a second ratio in the normal mode. In this case, the first ratio may be different from the second ratio.

The details thereof will be described in detail with reference to FIGS. 12 to 15.

Figure 12:
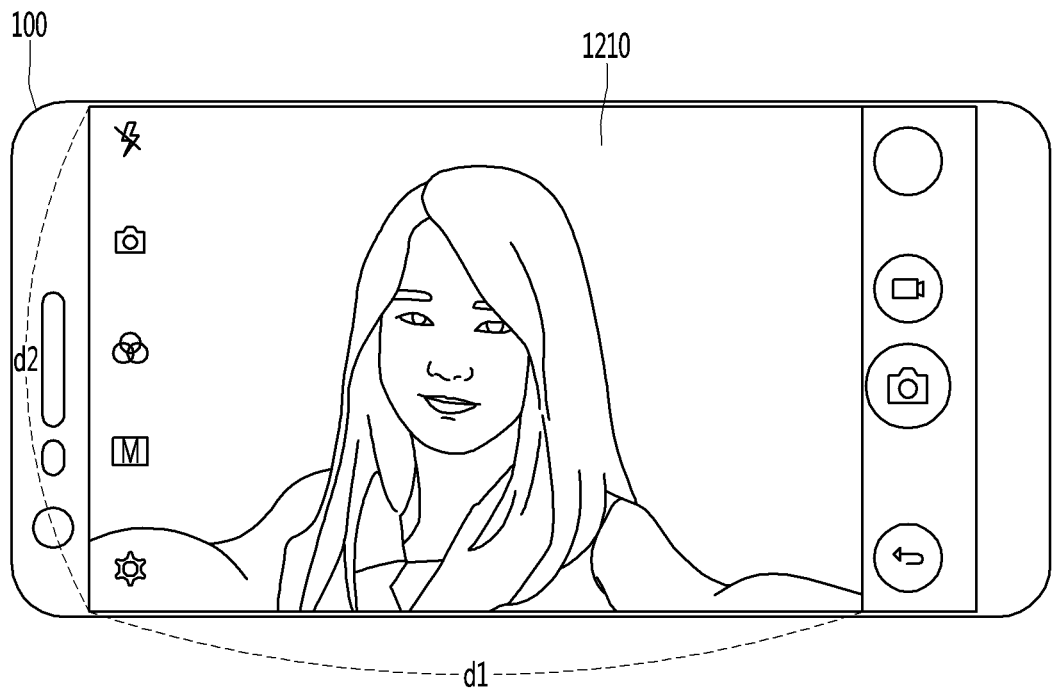
FIG. 12 is a view illustrating the first image at the first ratio, which is captured in the wide angle mode, according to an embodiment of the present invention.

FIG. 12 is a view illustrating the first image at the first ratio, which is captured in the wide angle mode, according to an embodiment of the present invention.

The controller 180 may capture the first image at the first ratio in the wide angle mode. In detail, when the distance between the mobile terminal 100 and the user is increased to the first distance or more in the state that the mobile terminal 100 operates in the normal mode, the controller 180 may switch the capture mode to the wide angle mode and may capture the image in the wide angle mode. In this case, the captured image may be the first image 1210 at the first ratio.

In this case, the first ratio may be a ratio between a width "d1" of the captured image to a length "d2" of the image. In this case, the first ratio, that is, the ratio between a width "d1" of the captured image to a length "d2" of the image may be 16:9.

Figure 13:
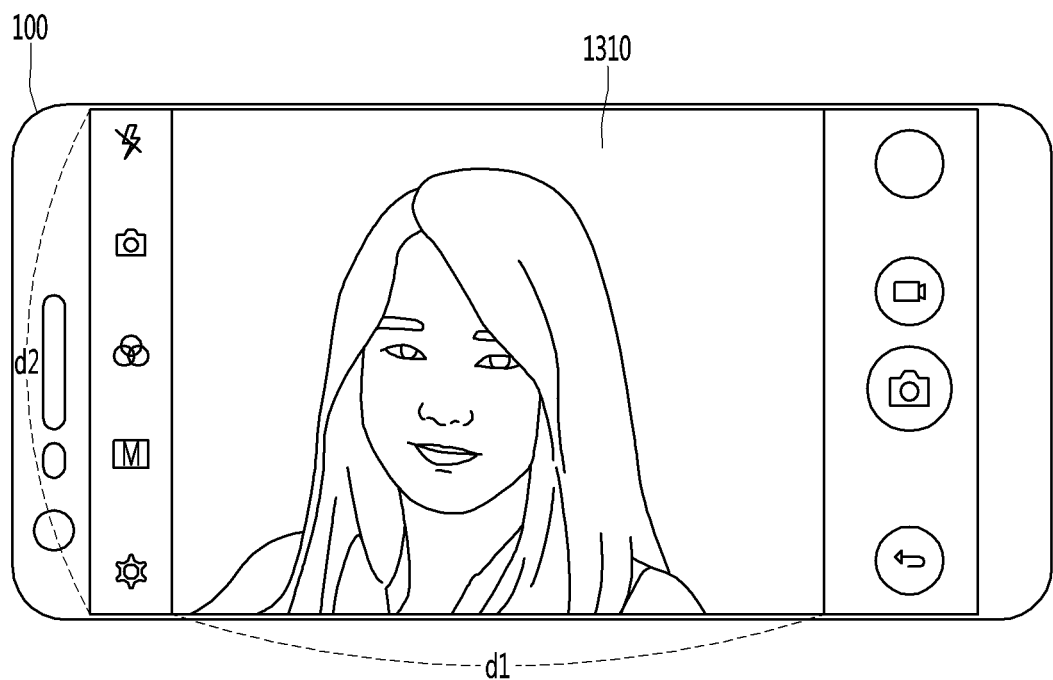
FIG. 13 is a view illustrating the second image at the second ratio, which is captured in the wide angle mode, according to an embodiment of the present invention.

FIG. 13 is a view illustrating the second image at the second ratio, which is captured in the normal mode, according to an embodiment of the present invention.

The controller 180 may capture the second image at the second ratio in the normal mode. In detail, when the distance between the mobile terminal 100 and the user is decreased to the second distance or more in the state that the mobile terminal 100 operates in the wide angle mode, the controller 180 may switch the capture mode to the normal mode and may capture the image in the normal. In this case, the captured image may be the second image 1310 at the second ratio.

In this case, the second ratio may be a ratio between a width "d1" of the captured image to a length "d2" of the image. In this case, the first ratio, that is, the ratio between a width "d1" of the captured image to a length "d2" of the image may be 4:3.

As described above, according to the present invention, the viewing angle may be changed by reflecting the intent of the user without an additional input for changing the viewing angle.

Meanwhile, when a user taking a selfie wants to capture an image of the user together with the user's friends, the user may move the mobile terminal 100 away from the user. In addition, when a user taking a selfie wants to capture an image of the user together with the friends of the user's, the user may want to extend the width of the image to be captured. In this case, according to the present invention, the mobile terminal 100 may change the ratio of the image captured by changing the mode such that the image is captured at the wide angle. Accordingly, the mobile terminal may provide the image matched to the intent of the user.

For another example, when the user taking a selfie wants to individually capture an image of only himself or herself, the user may move the mobile terminal 100 to be closer to the user. In addition, when a user taking a selfie wants to capture an image of only himself or herself, the user may reduce the width of an image to be captured. In this case, according to the present invention, the mobile terminal 100 may change the ratio of the image captured by changing the mode such that the image is captured at the normal angle. Accordingly, the mobile terminal may provide the image matched to the intent of the user.

Figure 14:
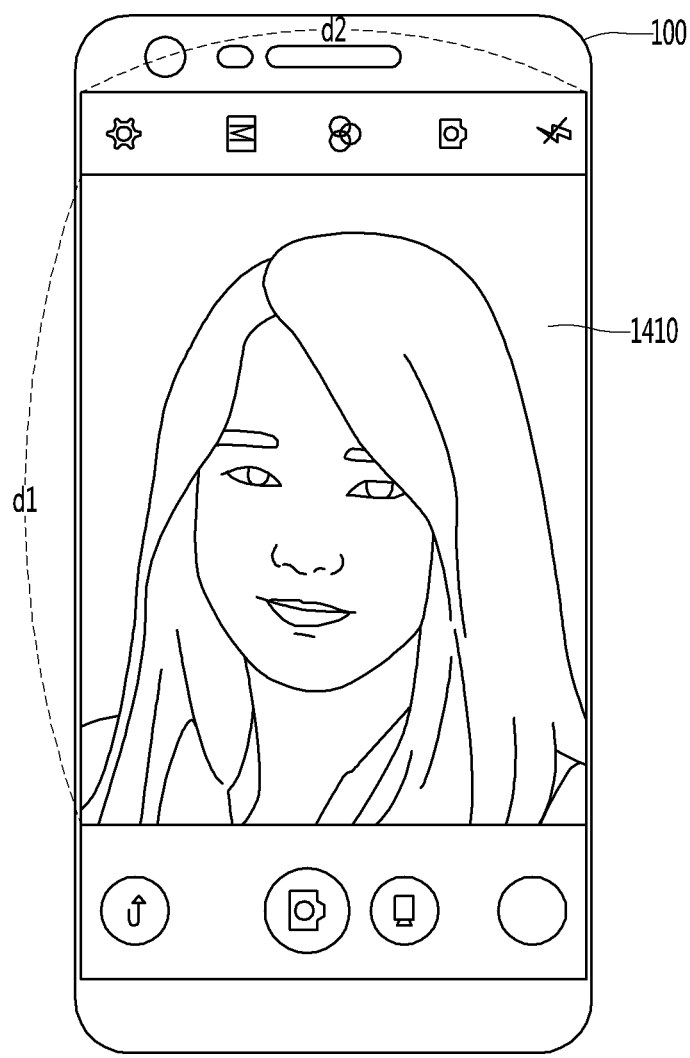
FIGS. 14 to 15 are views illustrating a method for changing the ratio based on the switching of the capture mode, according to another embodiment of the present invention.
Figure 15:
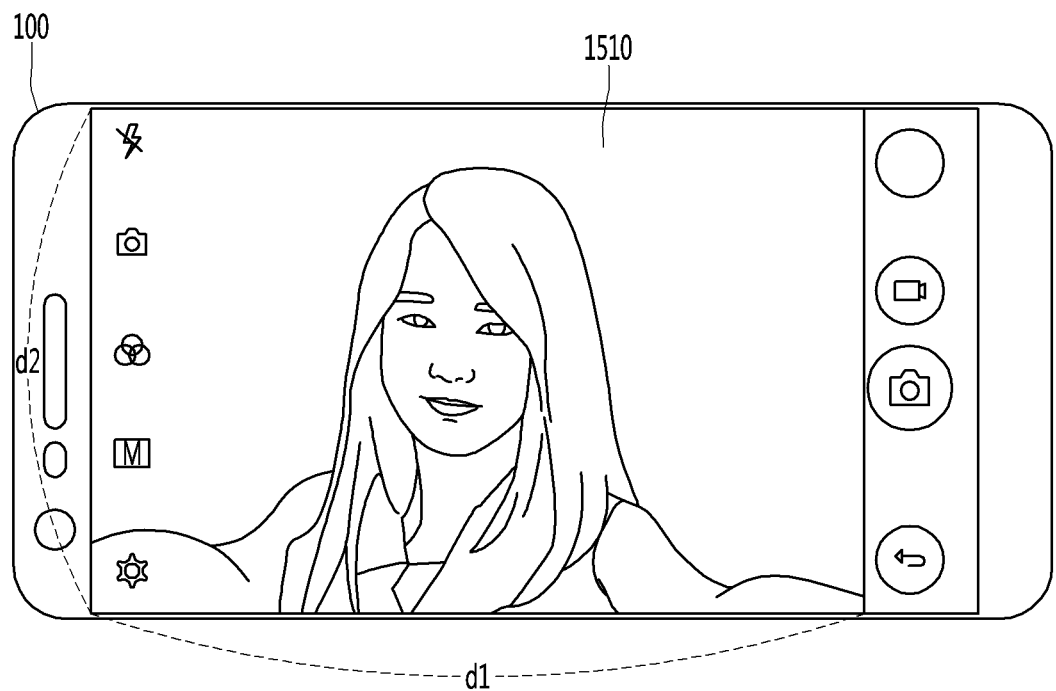

FIGS. 14 to 15 are views illustrating a method for changing the ratio based on the switching of the capture mode, according to another embodiment of the present invention.

The controller 180 may obtain information on whether the mobile terminal 100 is currently in a portrait mode or a landscape mode.

Meanwhile, as illustrated in FIG. 14, the controller 180 may operate in the normal mode in the state that the mobile terminal 100 is the portrait mode, and may capture a second image 1410 at a second ratio. In this case, the second ratio may be a ratio between a width "d1" of the captured image to a length "d2" of the image. In this case, the second ratio, that is, the ratio between a width "d1" of the captured image to a length "d2" of the image may be 4:3.

Meanwhile, the mode of the mobile terminal 100 may be changed from the portrait mode to the landscape mode, based on the input for moving the mobile terminal 100, as illustrated in FIG. 15. In the state that the mode of the mobile terminal 100 is changed to the landscape mode, the controller 180 operates in the wide angle mode to capture a first image 1510 at the first ratio. In this case, the first ratio may be a ratio between a width "d1" of the captured image to a length "d2" of the image. In this case, the first ratio, that is, the ratio between a width "d1" of the captured image to a length "d2" of the image may be 16:9.

As described above, according to the present invention, the viewing angle and the ratio of the screen may be changed by reflecting the intent of the user without an additional input.

For example, a user who has captured an image in the portrait mode changes the mode of the mobile terminal 100 to the landscape mode. This changing may be the intent of the user who wants to extend a transverse region of an image currently captured. In this case, according to the present invention, a capturing region is widened by changing the mode such that an image is captured at a wide angle and the ratio of the width of the image is additionally widened such that the left and right regions are more displayed. Accordingly, an image matched with the intent of the user may be provided.

Figure 16:
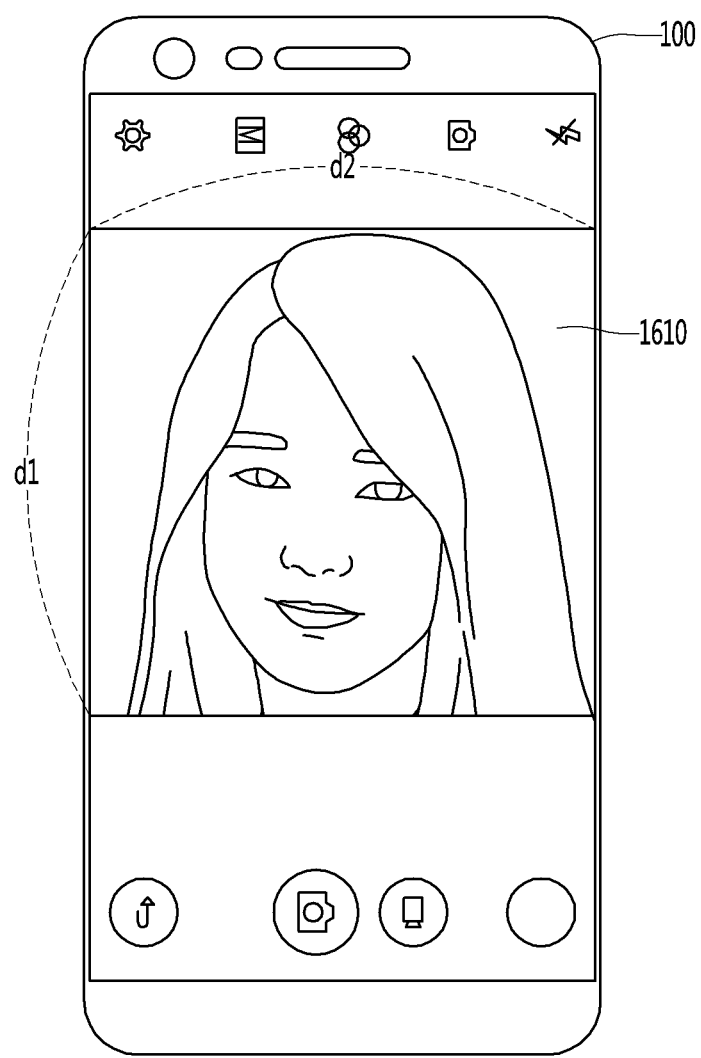
FIG. 16 is a view illustrating a method for changing the ratio based on the switching of the capture mode, according to another embodiment of the present invention.

FIG. 16 is a view illustrating a method for changing the ratio based on the switching of the capture mode, according to another embodiment of the present invention.

As described with reference to FIGS. 14 and 15, in the state that the mode of the mobile terminal 100 is changed from the portrait mode to the landscape mode, when the mode of the mobile terminal 100 is changed to the portrait mode, the controller 180 may capture a third image 1610 at a third ratio, as illustrated in FIG. 16. In detail, when the mode of the mobile terminal 100 is changed to the portrait mode again, the controller 180 operates in the normal mode and may capture the third image 1610 at the third ratio.

In this case, the third ratio may be a ratio between a width "d1" of the captured image to a length "d2" of the image. In this case, the third ratio, that is, the ratio between a width "d1" of the captured image to a length "d2" of the image may be 1:1.

As described above, according to the present invention, the viewing angle and the ratio of the screen may be changed without setting an additional ratio.

Meanwhile, according to an embodiment, although the above description has been made in that the first ratio is 16:9, the second ratio 4:3, and the third ratio 1:1, the present invention is not limited thereto. The first ratio, the second ratio, and the third ratio may be variously set. The first ratio, the second ratio, and the third ratio may also be changed based on the input received from the user.

Figure 17:
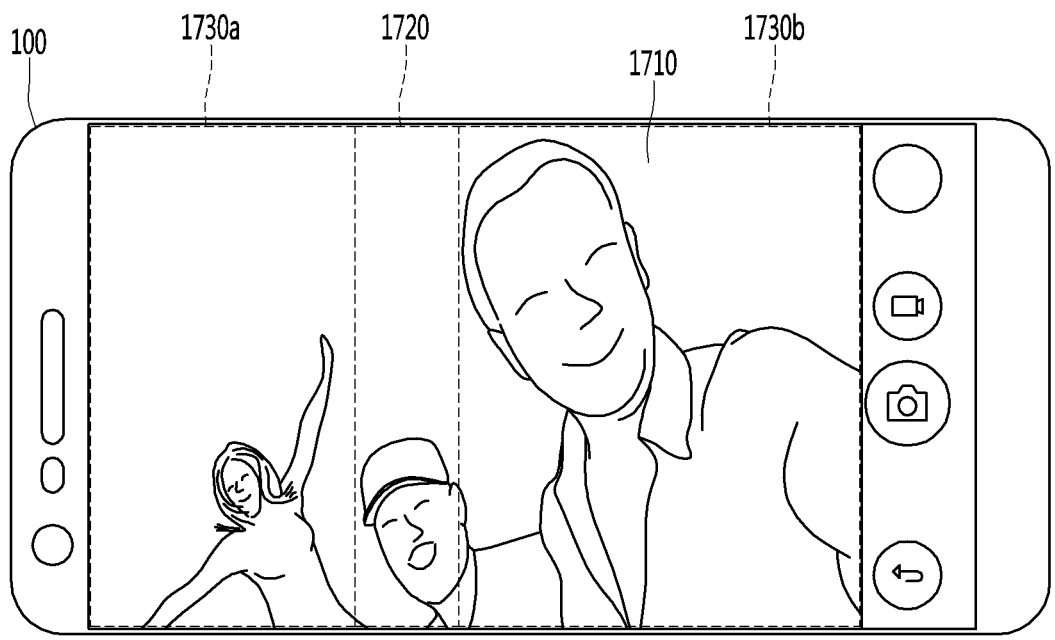
FIGS. 17 to 18 are views illustrating a method for displaying some of the whole region of the image corresponding to the wide angle, according to the embodiment of the present invention.
Figure 18:
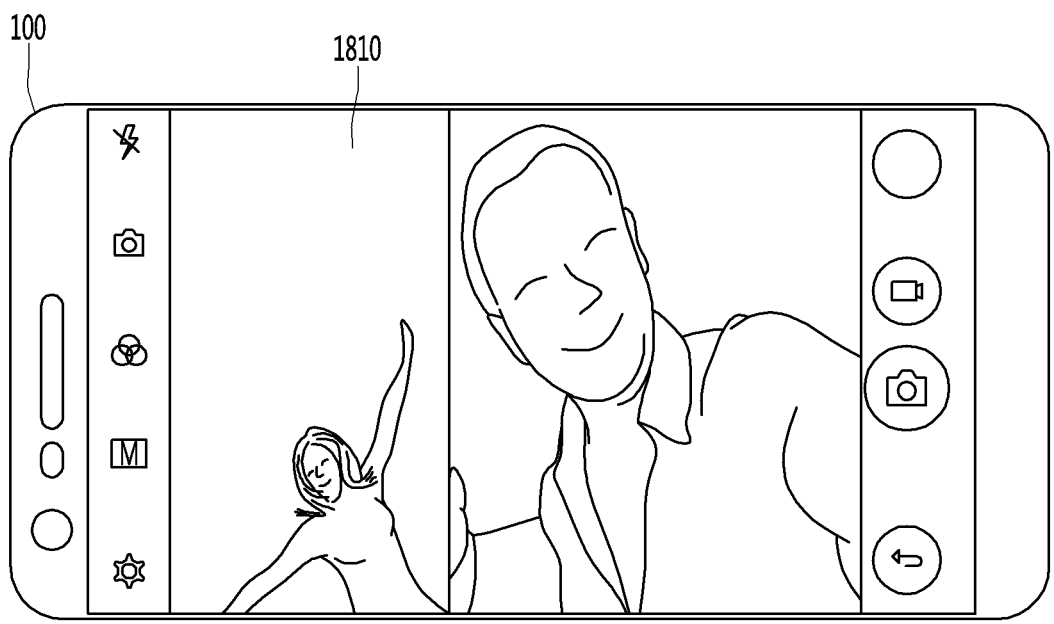

FIGS. 17 to 18 are views illustrating a method for displaying some of the whole region of the image corresponding to the wide angle, according to the embodiment of the present invention.

FIG. 17 is a view illustrating the mobile terminal 100 displaying an image 1710 corresponding to the wide angle.

When the mode of the mobile terminal 100 is a wide angle mode, the controller 180 may display the image 1710 corresponding to the wide angle.

Meanwhile, the entire region of the image 1710 corresponding to the wide angle may include a first region 1720 and second regions 1730a and 1730b.

Meanwhile, the controller 180 may receive a second input from a user. The second input will be described in detail with reference to FIGS. 19 to 20.

Meanwhile, when the second input is received, the controller 180 may change the capture mode of the mobile terminal 100 to the normal mode, as illustrated in FIG. 18. In addition, the controller 180 may display an image 1810 corresponding to the normal angle.

In this case, the image 1810 corresponding to the normal angle may be an image including a portion of the image 1710 corresponding to the wide angle. In detail, the image 1810 corresponding to the normal angle may be an image including second regions 1730a and 1730b of the entire region of the image 1710 corresponding to the wide angle. In addition, the image 1810 corresponding to the normal angle may be an image obtained by excluding the first region 1720 from the entire region of the image 1710 corresponding to the wide angle.

Meanwhile, when an input for capturing is received in the state that the image 1810 corresponding to the normal angle is displayed, the controller 180 may capture the image 1810 corresponding to the normal angle. In detail, the controller 180 may capture an image obtained by excluding the first region 1720 from the entire region of the image 1710 corresponding to the wide angle, and may store the captured image in the memory 170.

Figure 19:
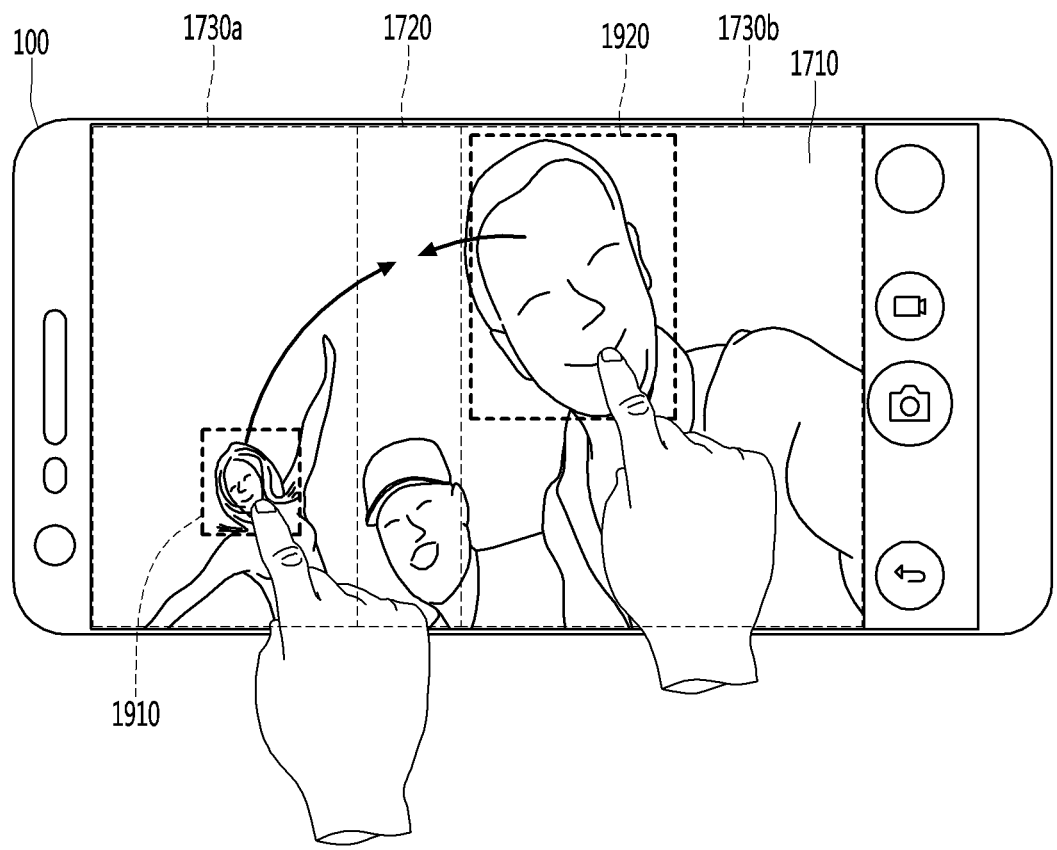
FIG. 19 is a view illustrating a method for determining the second region based on the second input according to an embodiment of the present invention.

FIG. 19 is a view illustrating a method for determining the second region based on the second input, according to an embodiment of the present invention.

The second input may be an input for selecting at least one object. In detail, when at least one object is touched, the controller 180 may determine that the at least one object is selected.

For example, on the assumption that a woman positioned the leftmost part of the image 1710 corresponding to the wide angle is a first person, a man positioned at the center of the image 1710 is a second person, the man put on a cap, and a man positioned at the rightmost part of the image 1710 is a third person, when the first person and the third person are touched, the controller 180 may determine that the first person and the third person are selected.

Meanwhile, the controller 180 may display a user interface 1910 representing that the first person is selected and a user interface 1920 representing that the third person is selected.

Meanwhile, the second regions 1730a and 1730b may include objects selected by the second input. For example, the second regions 1730a and 1730b may be regions including the first person and the third person selected by the second input.

To the contrary, the first region 1720 may be a region that does not include the object selected by the second input.

Meanwhile, when a drag input is received in a specific direction after at least one object is selected, the controller 180 may display an image corresponding to the normal angle other than a region positioned in the specific direction. For example, when the first person is selected by the touch and then dragged to the center, and when the third person is selected by the touch and then dragged to the center, as illustrated in FIG. 18, the controller 180 may display the image 1810 corresponding to the normal angle other than the first region 1720 positioned at the center of the image 1710 corresponding the wide angle.

Figure 20:
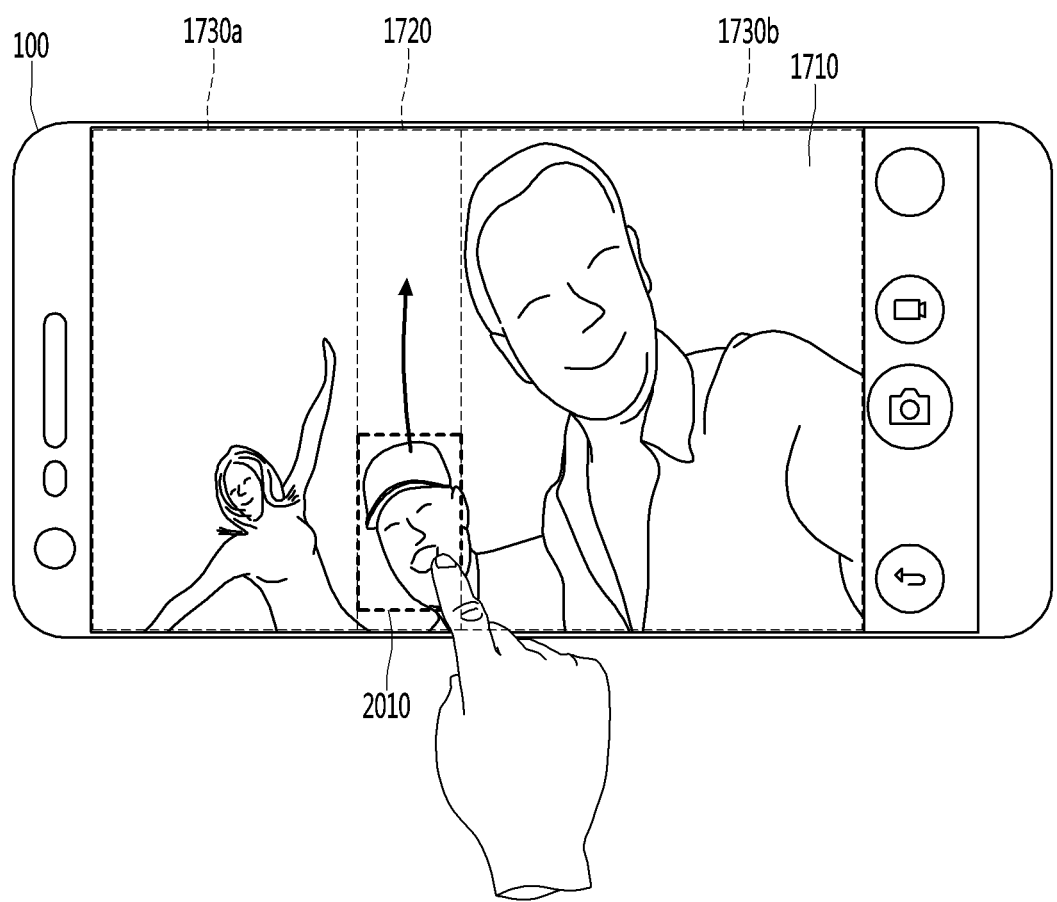
FIG. 20 is a view illustrating a method for determining the first region based on the second input according to an embodiment of the present invention.

FIG. 20 is a view illustrating a method for determining the first region based on the second input, according to an embodiment of the present invention.

The second input may be an input for selecting at least one object. In detail, when at least one object is touched, the controller 180 may determine that the at least one object is selected.

For example, on the assumption that a woman positioned the leftmost part of the image 1710 corresponding to the wide angle is a first person, a man positioned at the center of the image 1710 is a second person, the man putting on a cap, and a man positioned at the rightmost part of the image 1710 is a third person, when the second person is touched, the controller 180 may determine that the second person is selected.

Meanwhile, the controller 180 may display a UI 2010 representing that the second person is selected.

Meanwhile, the first region 1720 may be regions including objects selected by the second input. For example, the first region 1720 may be a region including the second person selected by the second input.

Meanwhile, when a drag input is received in a specific direction after at least one object is selected, the controller 180 may display an image corresponding to the normal angle other than the first region 1720. For example, when the second person is selected by the touch and dragged up, as illustrated in FIG. 18, the controller 180 may display the image 1810 corresponding to the normal angle and having no the first region 1720 including the second person.

Figure 21:
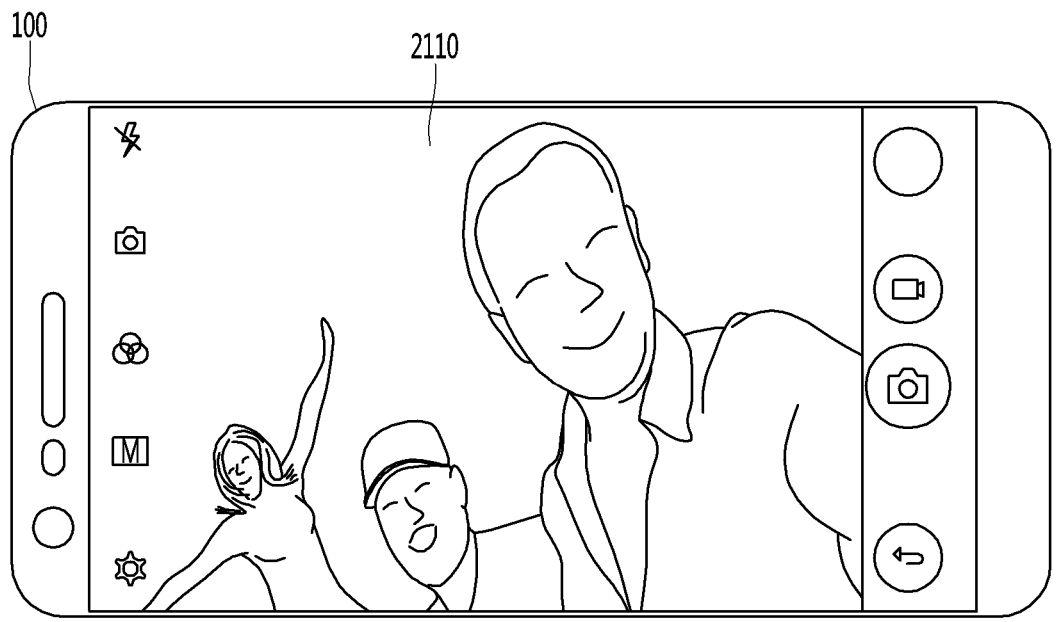
FIGS. 21 to 23 are views illustrating a method for changing the ratio of the image corresponding to the wide angle and the ratio of the image corresponding to the normal angle according to an embodiment of the present invention.
Figure 22:
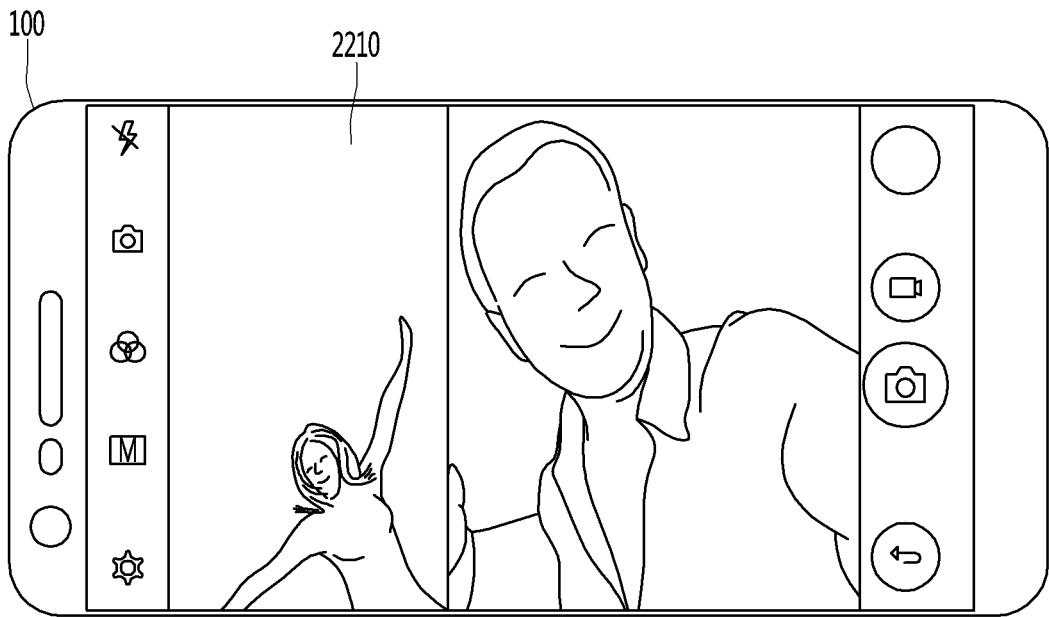
Figure 23:
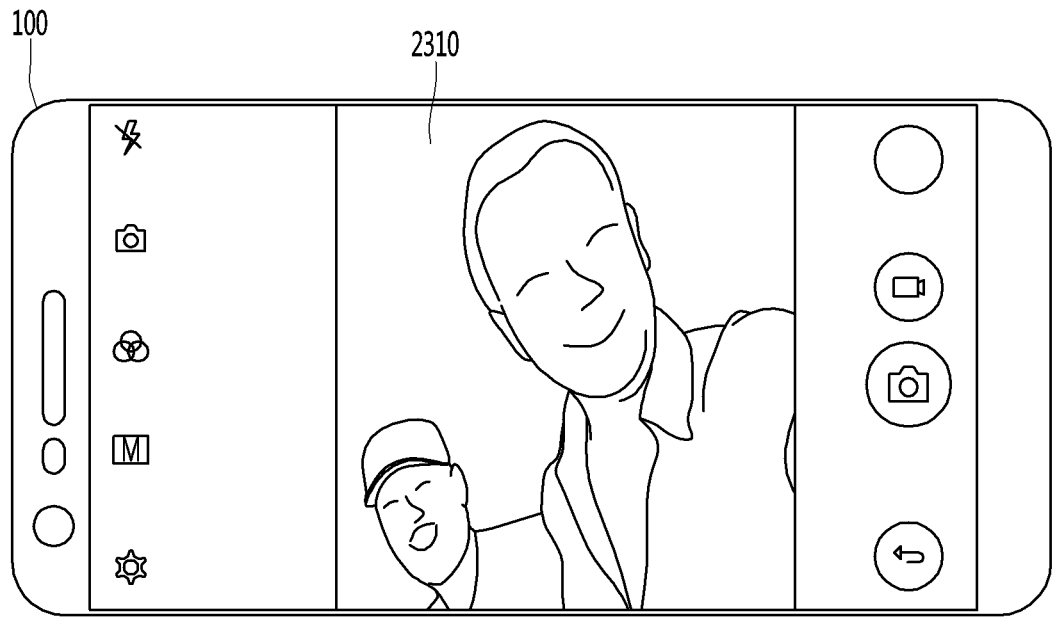

FIGS. 21 to 23 are views illustrating a method for changing the ratio of the image corresponding to the wide angle and the ratio of the image corresponding to the normal angle, according to an embodiment of the present invention.

FIG. 21 is a view illustrating the mobile terminal 100 displaying an image 2110 corresponding to the wide angle.

When the mode of the mobile terminal 100 is a wide angle mode, the controller 180 may display the image 2110 corresponding to the wide angle. In this case, the controller 180 may display an image 2110 corresponding to the wide angle at a first ratio. For example, the image 2110 corresponding to the wide angle may be displayed at the ratio of 16:9.

FIG. 22 is a view illustrating the mobile terminal 100 displaying an image 2210 corresponding to the normal angle and having no the first region described with reference to FIG. 17.

When the mode of the mobile terminal 100 is a normal mode, the controller 180 may display the image 2210 corresponding to the normal angle. In this case, the controller 180 may display an image 2210 corresponding to the normal angle at a second ratio. For example, the image 2210 corresponding to the wide angle may be displayed at the ratio of 4:3.

FIG. 23 is a view illustrating the mobile terminal 100 displaying an image 2310 corresponding to the normal angle and having no the first region. The following description will be made on the assumption that the first region is a region 1730a of FIG. 17.

The controller 180 may display the image 2310 corresponding to an angle smaller than the normal angle. In this case, the controller 180 may display an image 2310 corresponding to the angle smaller than the normal angle at a third ratio. For example, the image 2310 corresponding to the angle smaller than the normal angle may be displayed at the ratio of 1:1.

Meanwhile, the controller 180 may display the image 2210 corresponding to the normal angle at the second ratio or may display the image 2310, which corresponds to the angle smaller than the normal angle, at the third ratio, based on the first region.

For example, although the first region is excluded from the image 2210 corresponding to the normal angle of FIG. 22, the size of the first region may be less. Accordingly, since the region excluded from the image 2110 corresponding to the wide angle is smaller, the image 2210 corresponding to the normal angle may be displayed at the ratio of 4:3 which is relatively reduced from the image 2110 corresponding to the wide angle in the length thereof.

Although the first region is excluded from the image 2310 corresponding to the angle smaller than the normal angle of FIG. 23, the size of the first size is larger. Accordingly, since the region excluded from the image 2110 corresponding to the wide angle is larger, the image 2310 corresponding to the angle smaller than the normal angle may be displayed at the ratio of 1:1 which is relatively reduced from the image 2110 corresponding to the wide angle in the length thereof.

Meanwhile, the image 2210 corresponding to the normal angle has a viewing angle range narrower than that of the image 2110 corresponding to the wide angle, which does not refer to that the horizontal viewing angle and the vertical viewing angle are identically reduced. For example, although the up and down viewing angles of the image 2210 corresponding to the normal angle are reduced by 1 degree from the up and down viewing angles of the image 2110 corresponding to the wide angle, the left and right viewing angles of the image 2210 corresponding to the normal angle may be reduced by a second angle greater than the first angle from the left and right viewing angles of the image 2110 corresponding to the wide angle. For example, although the up and down viewing angles of the image 2210 corresponding to the normal angle are not reduced from the up and down viewing angles of the image 2110 corresponding to the wide angle, the left and right viewing angles of the image 2210 corresponding to the normal angle may be reduced by the second angle from the left and right viewing angles of the image 2110 corresponding to the wide angle.

Accordingly, displaying the image 2210 corresponding to the normal angle at the second ratio may refer to displaying, at the second ratio, an image obtained by identically reducing the upper and lower viewing angles and the left and right angles from the image 2110 corresponding to the wide angle. Meanwhile, displaying the image 2210 corresponding to the normal angle at the second ratio may refer to reducing the up and down viewing angles of the image 2110 corresponding to the wide angle by the first angle, and the left and right viewing angles of the image 2110 by the second angle greater than the first angle such that the image corresponding to the normal angle is displayed at the second ratio.

Similarly, displaying the image 2310 corresponding to an angle smaller than the normal angle at the third ratio may refer to displaying, at the third ratio, an image obtained by identically reducing the upper and lower viewing angles and the left and right angles from the image 2110 corresponding to the wide angle. Meanwhile, displaying the image 2310 corresponding to the angle smaller than the normal angle at the third ratio may refer to reducing the up and down viewing angles of the image 2110 corresponding to the wide angle by the third angle, and the left and right viewing angles of the image 2110 by the fourth angle greater than the third angle such that the image 2310 corresponding to the angle smaller than the normal angle is displayed at the third ratio.

Meanwhile, an image obtained by excluding the first region from the image 2110 corresponding to the wide angle may not be exactly matched with the second ratio or the third ratio.

In this case, when the ratio of the image obtained by excluding the first region from the image 2110 corresponding to the wide angle approximates to the second ratio rather than the third ratio, the controller 180 may display the image corresponding to the normal angle at the second ratio.

For example, when the ratio of the image obtained by excluding the first region from the image 2110 corresponding to the wide angle is 3:9:3, which is more approximate to the second ratio of 4:3, the controller 180 may display the image corresponding to the normal angle at the second ratio. In this case, the controller 180 may add or delete a partial region such that the ratio of the image obtained by excluding the first region is the second ratio.

In this case, when the ratio of the image obtained by excluding the first region from the image 2110 corresponding to the wide angle approximates to the third ratio rather than the second ratio, the controller 180 may display the image corresponding to the angle smaller than the normal angle at the third ratio.

For example, when the ratio of the image obtained by excluding the first region from the image 2110 corresponding to the wide angle is 1:1:1, which is more approximate to the third ratio of 1:1, the controller 180 may display the image corresponding to the angle smaller than the normal angle at the third ratio. In this case, the controller 180 may add or delete a partial region such that the ratio of the image obtained by excluding the first region is the third ratio.

When the capture mode is changed from the wide angle mode to the normal mode, an image is displayed without a partial region. However, when outer regions are uniformly excluded, a region desired to be captured by the user may be deleted. However, according to the present invention, although the image is provided with the reduced viewing angle, the region desired to be captured by the user may be provided without omission.

In addition, when a specific area is deleted, a uniform viewing angle range is not applied to provide the image, and various images having various viewing angles are provided depending on the size of the deleted region. Accordingly, various images matched with the intent of the user may be provided for the user.

Figure 24:
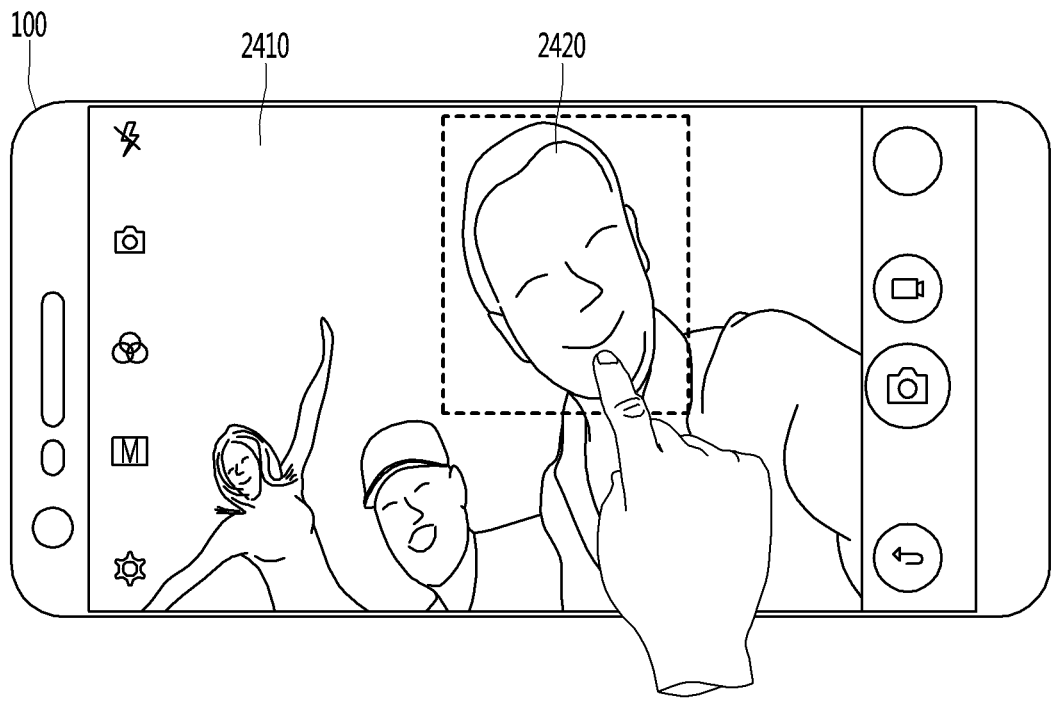
FIGS. 24 to 26 are views illustrating a method for determining an image corresponding to the normal angle based on the specification of the user according to an embodiment of the present invention.
Figure 25:
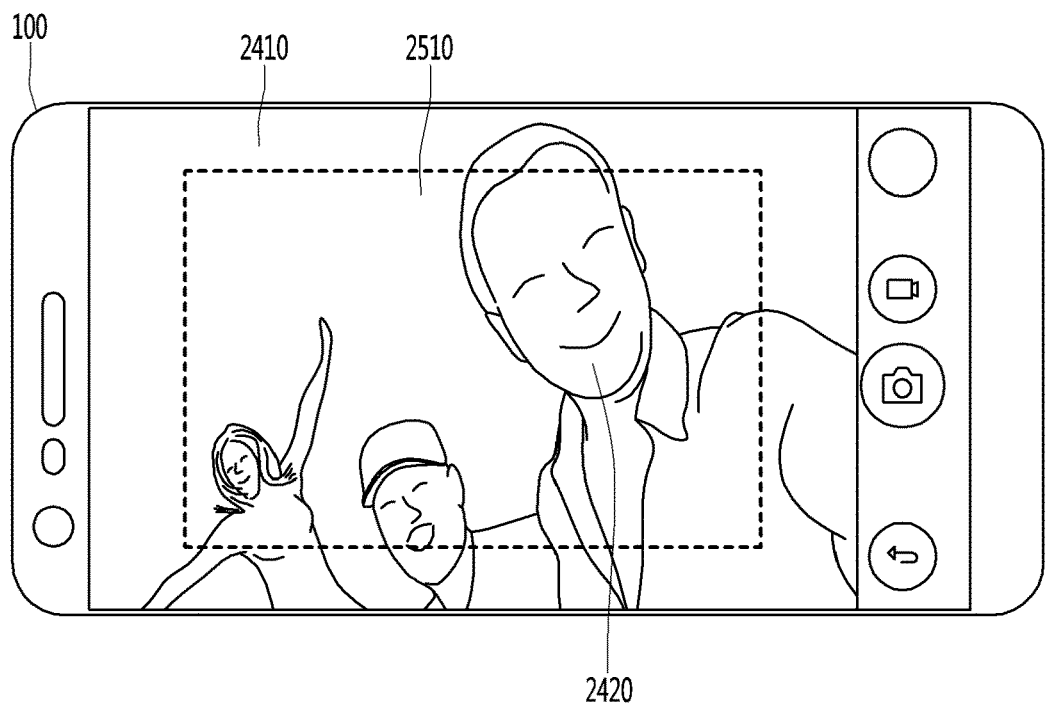
Figure 26:
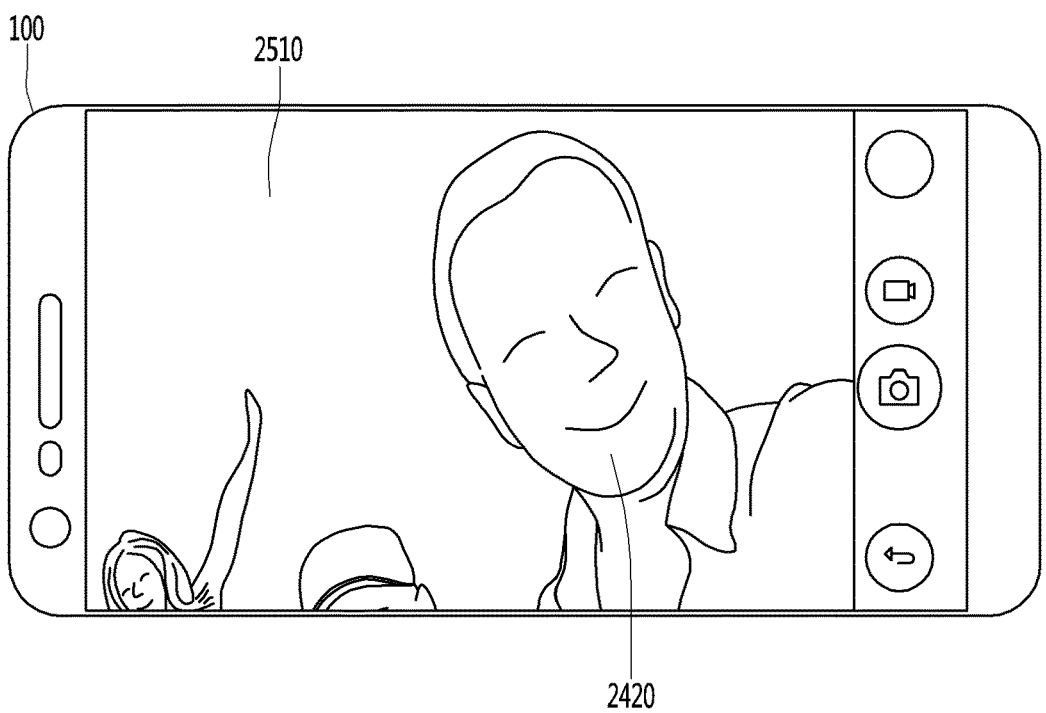

FIGS. 24 to 26 are views illustrating a method for determining an image corresponding to the normal angle based on the specification of the user.

FIG. 24 is a view illustrating the mobile terminal 100 displaying an image 2410 corresponding to the wide angle.

A user may want to display a face 2420 of the third person without cropping the face 2420.

However, as the capture mode is changed from the wide angle mode to the normal mode, when an image corresponding to the normal angle is displayed, and when the up, down, left, and right regions are uniformly removed, an image 2510 corresponding to the normal angle and having no the face 2420 of the third person may be displayed.

Meanwhile, the controller 180 may receive an input for selecting a specific object. For example, as illustrated in FIG. 24, the controller 180 may receive the input for selecting a face 2420 of the third person.

In addition, when the capture mode is changed from the wide angle mode to the normal mode, the controller 180 may display an image 2510 corresponding to the normal angle and including the entire portion of a specific object selected by the user, as illustrated in FIG. 26. For example, the controller 180 may display the image 2510 corresponding to the normal angle and including the entire portion of the face of the third person 2420.

Figure 27:
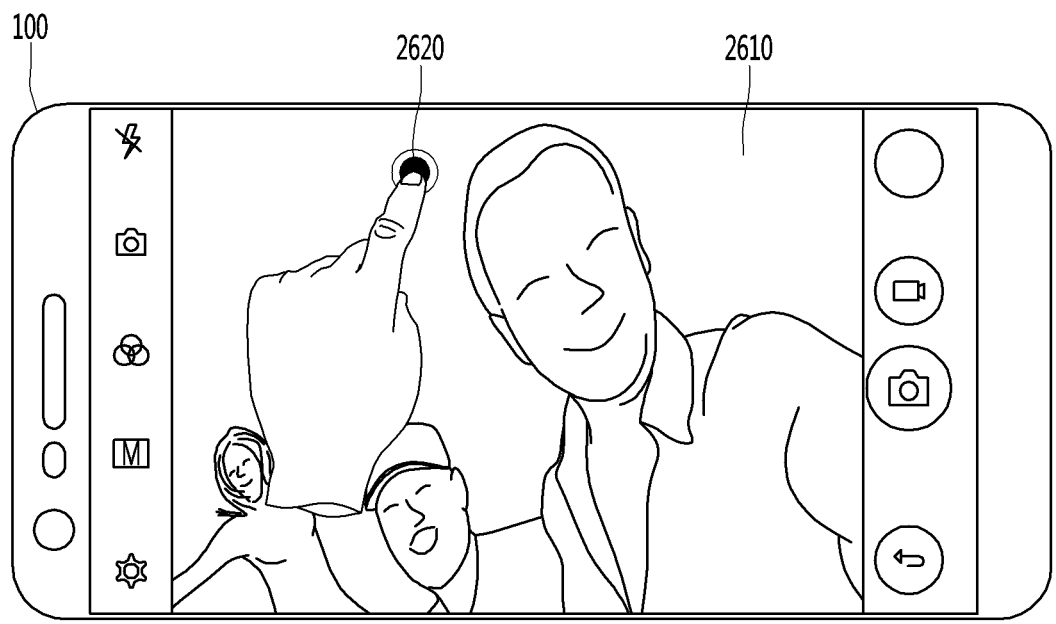
FIGS. 27 to 29 are views illustrating a method for determining an image corresponding to the normal angle based on the specification of the user according to another embodiment of the present invention.
Figure 28:
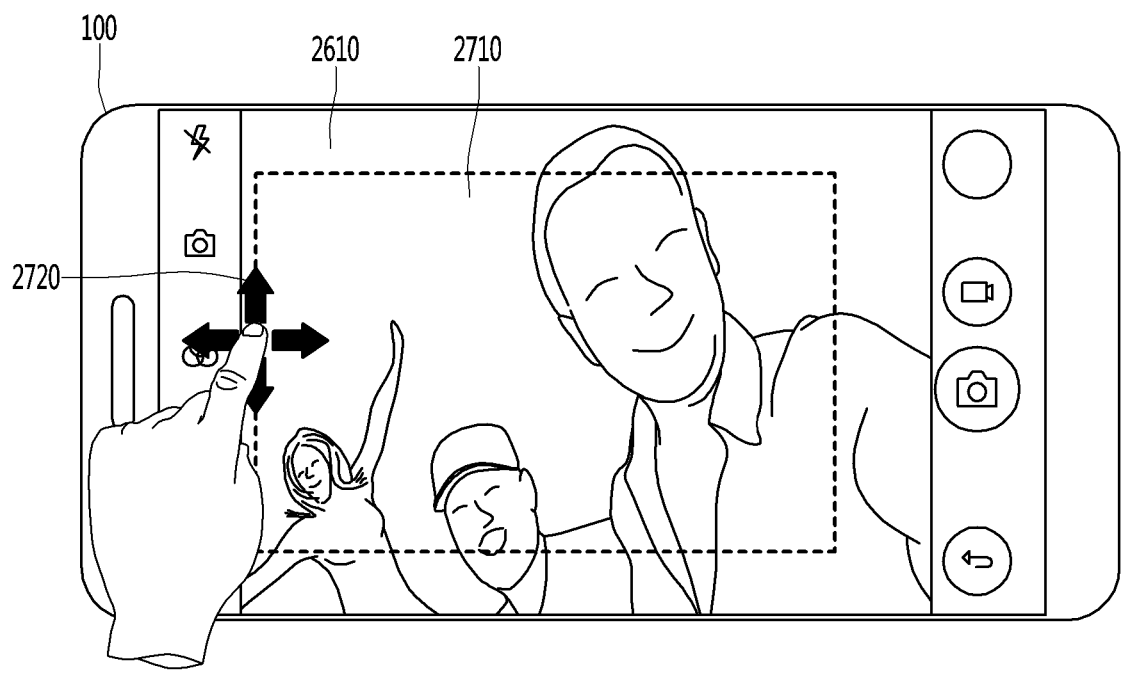
Figure 29:
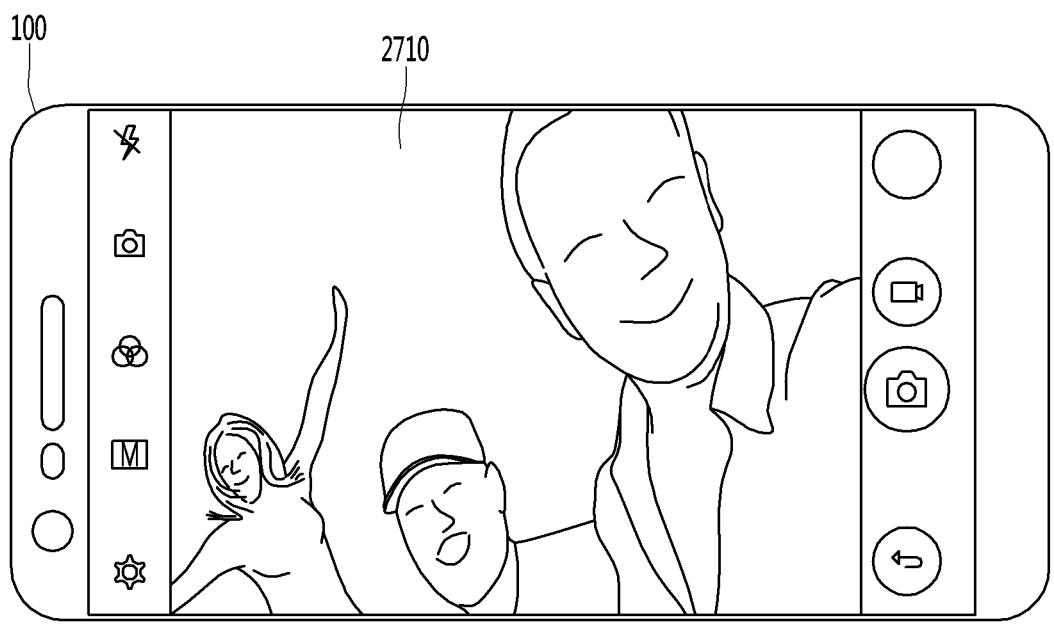

FIGS. 27 to 29 are views illustrating a method for determining an image corresponding to the normal angle based on the specification of the user, according to another embodiment of the present invention.

FIG. 27 is a view illustrating the mobile terminal 100 displaying an image 2610 corresponding to the wide angle.

The controller 180 may receive an input for specifying an image corresponding to the normal angle. For example, the controller 180 may receive an input 2620 of a long press to a screen as illustrated in FIG. 27.

Meanwhile, when the input for specifying the image corresponding to the normal angle is received, the controller 180 may display a user interface to divide the first region 2720 and the second region 2710, together with an image 2610 corresponding to the wide angle as illustrated in FIG. 28.

Meanwhile, the controller 180 may change a first region 2720 and a second region 2710 based on a third input. In this case, the third input may be an input for moving the second region 2710. Meanwhile, when the second region 2710 is moved, the second region 2710 is changed, and the first region 2720 is changed.

Meanwhile, when the changes of the first region 2720 and the second region 2710 are completed, the controller 180 may display an image, which corresponds to the normal angle and is obtained by excluding the first region 2720 from the image 2610 corresponding to the wide angle, as illustrated in FIG. 29.

As described above, according to the present invention, the user may personally set and capture a region of an image corresponding to the normal angle.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A mobile terminal comprising:
a display;
a camera including a wide angle lens;
an input interface configured to receive an input from a user; and
a controller configured to control the camera to capture an image in one of a normal mode for capturing an image at a normal angle and a wide angle mode for capturing an image at a wide angle which is greater than the normal angle, based on a first input for moving the mobile terminal,
wherein the controller is further configured to:
control the display to display an image corresponding to the wide angle when the mode of the mobile terminal is the wide angle mode, wherein the image includes a first region including a first object and a second region including a second object,
receive a second input for dragging the first object to the second region,
change a capture mode from the wide angle mode to the normal mode according to the second input, and
control the display to display an image corresponding to the normal angle other than the second region.

2. The mobile terminal of claim 1, wherein the controller is configured to:
acquire information on at least one of an increase or a decrease in a distance between the mobile terminal and the user;
capture the image at the wide angle when the distance between the mobile terminal and the user is increased to a first distance or more in a state that the mobile terminal is in the normal mode; and
capture the image at the normal mode when the distance between the mobile terminal and the user is decreased to a second distance or more in a state that the mobile terminal is in the wide angle mode.

3. The mobile terminal of claim 2, wherein the controller is configured to:
increase a viewing angle of a captured image when the distance between the mobile terminal and the user is increased in the state that the mobile terminal is in the normal mode; and
capture the image at the wide angle when the distance between the mobile terminal and the user is increased to the first distance or more.

4. The mobile terminal of claim 1, wherein the controller is configured to:
capture a first image at a first ratio in the wide angle mode; and
capture a second image at a second ratio in the normal mode, and
wherein the first ratio is mutually different from the second ratio.

5. The mobile terminal of claim 4, wherein the controller is configured to:
capture the first image at the first ratio in the wide angle mode when the distance between the mobile terminal and the user is increased in the state that the mobile terminal is in the normal mode; and
capture the second image at the second ratio in the normal mode when the distance between the mobile terminal and the user is decreased in the state that the mobile terminal is in the wide angle mode.

6. The mobile terminal of claim 4, wherein the controller is configured to:
capture the second image at the second ratio in the normal mode when the mobile terminal operates in a portrait mode; and
capture the first image at the first ratio in the wide angle mode when the mobile terminal operates in a landscape mode.

7. The mobile terminal of claim 6, wherein the controller is configured to:
capture a third image at a third ratio when the mode of the mobile terminal is changed to the portrait mode, in a state that the mode of the mobile terminal is changed from the portrait mode to the landscape mode.

8. The mobile terminal of claim 1, wherein the image corresponding to the wide angle is displayed at a first ratio, and wherein the controller is configured to:

display the image corresponding to the normal angle at a second ratio, or display an image corresponding to an angle smaller than the normal angle at a third ratio, based on a size of the first region.

9. The mobile terminal of claim 8, wherein the controller is configured to:

display the image corresponding to the normal angle at the second ratio when a ratio of the image obtained by excluding the first region from the image corresponding to the wide angle is closer to the second ratio rather than a third ratio, and display an image corresponding to the angle smaller than the normal angle at the third ratio when the ratio of the image obtained by excluding the first region from the image corresponding to the wide angle is closer to the third ratio rather than the second ratio.

10. The mobile terminal of claim 1, wherein the controller is configured to:

display a user interface (UI) dividing the first region and the second region together with the image corresponding to the wide angle; and change the first region and the second region based on a third input.

11. The mobile terminal of claim 1, wherein the camera is mounted on a front surface of the mobile terminal.

* * * * *